United States Patent
Pasupulati et al.

(10) Patent No.: US 10,339,505 B2
(45) Date of Patent: Jul. 2, 2019

(54) PAYMENT MECHANISM INTEGRATION WIZARD

(75) Inventors: Srinivasa Rao Pasupulati, Cupertino, CA (US); Amish Patel, Fremont, CA (US); Nick Groleau, Mountain View, CA (US); William Charles Taylor, Alviso, CA (US); Saleem Qadir, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 1417 days.

(21) Appl. No.: 13/586,763

(22) Filed: Aug. 15, 2012

(65) Prior Publication Data

US 2012/0311433 A1 Dec. 6, 2012

Related U.S. Application Data

(63) Continuation of application No. 12/171,983, filed on Jul. 11, 2008, now Pat. No. 8,249,950.

(51) Int. Cl.
| | |
|---|---|
| G06Q 40/00 | (2012.01) |
| G06Q 20/02 | (2012.01) |
| G06Q 20/04 | (2012.01) |
| G06Q 20/12 | (2012.01) |
| G06Q 20/40 | (2012.01) |
| G06Q 30/06 | (2012.01) |

(52) U.S. Cl.
CPC .......... *G06Q 20/02* (2013.01); *G06Q 20/04* (2013.01); *G06Q 20/12* (2013.01); *G06Q 20/40* (2013.01); *G06Q 20/405* (2013.01); *G06Q 30/06* (2013.01); *G06Q 30/0601* (2013.01)

(58) Field of Classification Search
CPC .... G06Q 30/06; G06Q 30/0601; G06Q 30/02; G06Q 20/12; G06Q 20/40
USPC .................................. 705/3, 44, 37, 40, 35
See application file for complete search history.

(56) References Cited

U.S. PATENT DOCUMENTS 7,013,289 B2 * 3/2006 Horn et al. ................ 705/14.51
7,305,397 B2 * 12/2007 Spencer, Jr.
(Continued)

OTHER PUBLICATIONS

Anonymous "Trillium(R)+plus SIGTRAN from Continuous Computing(R) Provides High-Performance Binary Software Signaling Solution; Third Offering in Integrated Solutions Product Line Accelerates Time to Market at Fraction of the Cost." Jan. 25, 2006, Business Wire, NA.
(Continued)

*Primary Examiner* — Kelly S Campen
(74) *Attorney, Agent, or Firm* — Haynes and Boone, LLP

(57) ABSTRACT

Provided is a method and a web-site integration system to integrate payment mechanisms into a commercial website that offers online merchants a flexible, user-friendly and customizable wizard to integrate payment mechanisms into their online commercial websites without having to understand the detailed intricacies of an API or other computer code. The wizard steps the merchant through creating an account to obtain credentials and educates the merchant on the page flows of the payment mechanism that the merchant wishes to integrate. Then, the wizard generates code snippets and files to be downloaded by the merchant and to be easily inserted into key pages of the merchant's online commercial website. The merchant can then test the completely integrated code in a developer's sandbox or go live with the completely integrated code.

21 Claims, 28 Drawing Sheets

(56) References Cited

U.S. PATENT DOCUMENTS

| | | | |
|---|---|---|---|
| 2003/0229590 A1* | 12/2003 | Byrne et al. | 705/40 |
| 2004/0044672 A1* | 3/2004 | Spencer, Jr. | 707/100 |
| 2004/0148229 A1* | 7/2004 | Maxwell | 705/26 |
| 2005/0086197 A1* | 4/2005 | Boubez et al. | 707/1 |
| 2005/0273405 A1* | 12/2005 | Chen | 705/35 |
| 2007/0005436 A1* | 1/2007 | Baum et al. | 705/26 |
| 2008/0103923 A1* | 5/2008 | Rieck et al. | 705/26 |
| 2008/0228655 A1* | 9/2008 | Guo et al. | 705/76 |
| 2008/0262964 A1* | 10/2008 | Bezos et al. | 705/39 |
| 2008/0270909 A1* | 10/2008 | Kaufman et al. | 715/738 |
| 2009/0094197 A1* | 4/2009 | Fein et al. | 707/3 |
| 2009/0240594 A1* | 9/2009 | Kerner et al. | 705/26 |
| 2009/0265237 A1* | 10/2009 | deMartino et al. | 705/14 |
| 2009/0306893 A1* | 12/2009 | Lilley | 701/300 |
| 2009/0307091 A1* | 12/2009 | Lilley | 705/14.58 |
| 2009/0319427 A1* | 12/2009 | Gardner et al. | 705/44 |

OTHER PUBLICATIONS

Anonymous "Payment Processing, Inc. Partners with Aldelo Systems, Inc. to Offer Comprehensive Credit Card Processing Solution; Benefits include faster transaction times, unlimited gateway access and technical support. (Company overview)." Jun. 13, 2006, Business Wire, NA.

Anonymous, "Brooks Software Announces Release of PROMIS(R) 5.8 Manufacturing Execution System (MES)." Nov. 14, 2006, PR Newswire, NA.

* cited by examiner

PayPal *Integration Wizard*

[1] Code  [2] Cart  [3] Billing  [4] Review  [5] Confirm  [6] Complete

Step 1. Input and Generate Code

| API Credentials | API Username |
| | API Password |
| | Signature |
| | How to get PayPal API credentials? |

Shopping Cart Programming Language: [Active Server Pages (ASP) ▼] ~710

Return URL: [_____] ⓘ ~715
Example: http://www.yourstore.com/OrderConfirmPage.xxx Cancel URL: [_____] ⓘ ~720
Example: http://www.yourstore.com/MainPage.xxx Payment Type: [Sale ▼] ~725
What is this?

Currency Code: [US Dollars [USD] ▼] ⓘ ~730

[Generate and Continue]

PayPal Integration Center | Paypal Home
Copyright © 1999-2008 PayPal. All rights reserved          PayPal an eBay Company

FIG. 7A

PAYMENT MECHANISM INTEGRATION WIZARD

CROSS REFERENCE TO RELATED APPLICATION

The present application is a continuation application of U.S. patent application Ser. No. 12/171,983, filed Jul. 11, 2008, now U.S. Pat. No. 8,249,950, issued Aug. 21, 2012.

FIELD OF THE INVENTION

The present invention relates to online, internet-based financial transaction programs and commercial systems and more particularly to a method and system where merchants are able to integrate financial transaction payment mechanism code seamlessly into their own commercial websites.

BACKGROUND OF THE INVENTION

With the advent of the internet and online electronic commerce (e-commerce), financial transaction programs that allow users to seamlessly purchase products, transfer and receive funds over an internet connection have been in high demand.

Traditional methods of executing financial transactions have been limited to a user providing his or her credit card, debit card, or checking account number on a commercial website, or using checks, money orders and other forms of paper-based payments. However, these means of executing financial transactions are often cumbersome, slow, and inconvenient, requiring a user to remember a multitude of account numbers, login data and passwords. This often results in significant time delays for payment processing. Furthermore, security and fraud concerns are prevalent. For instance, a user is often reluctant to provide sensitive credit card or debit card information over an internet connection, regardless of how "secure" an internet connection claims to be.

Recent financial transaction programs have emerged as a means for a user to pay for purchases, transfer money, receive money (if the user is a merchant), store shipping addresses, and set up multiple financial accounts (e.g. checking or savings, credit card, debit card) all with one single login and password. Security and fraud concerns are also mitigated by means of online financial security precautions, encryption methods, and anti-phising programs that are inherent in online, internet-based financial transaction systems.

Merchants may decide to use such a financial transaction program in order to receive funds from customers who purchase products from their commercial websites. There are several "payment mechanisms" that enable merchants to receive funds from customers. For instance, certain mechanisms enable customers to enter their credit card, debit card or go to an external login site to enter their account information, pay for the product, and then proceed to checkout.

However, it is difficult for merchants to integrate these payment mechanisms without significant experience with the associated application programming interface (API) or knowledge of computer code. Merchants or vendors have to understand the API, have to know how to code in the specific provided language (i.e. ASP, ASP.NET, JSP, Java, PHP) and have to know how to develop complicated code that interfaces with a plurality of servers and databases during an online financial transaction between a customer and a merchant.

Currently, there are no user-friendly programs that present a simple contextual page flow and that also simultaneously generate the necessary code to integrate into a merchant's commercial website.

Therefore, there is a need in the art for a simple, user-friendly and customizable method and system that allows a merchant to seamlessly integrate payment mechanisms inherent to financial transaction programs into their commercial websites, without having to know an API library or the details of a particular code (i.e. ASP, JSP, PHP, .Net, Java).

SUMMARY

According to one embodiment, a method is provided to integrate payment mechanisms and a web-site integration system that offers online merchants a flexible, user-friendly and customizable way to integrate payment mechanisms into their online commercial websites without having to understand the detailed intricacies of an API or other computer code.

First, a merchant creates an API-based account to obtain API Credentials or create a non-API based account to obtain non-API Credentials (e.g. such as Payflow Credentials with a PayPal Merchant Account), Then, the merchant selects a payment mechanism from an integration wizard to integrate into his or her commercial website. The merchant should understand the payment mechanism, such as by understanding the page flows of that particular payment mechanism, which may be accomplished by presenting the merchant with page flows associated with the payment mechanism.

This allows the merchant to understand a common terminology for the different pages of the payment mechanism, such as a shopping cart site, e.g., Shopping Cart Page, Shipping Address Page, Billing Page, Order Review Page and finally the Order Confirmation Page. Then, the merchant provides API Credentials and other parameters (such as a Shopping Cart Programming Language, an Environment, a Return URL, a Cancel URL, Payment Type and Currency Code) as inputs to the wizard.

After the developer or merchant submits the requested data, the integration wizard generates a plurality of code snippets and a plurality of files. The code snippets can be cut and pasted into the respective sections (Shopping Cart Page, Billing Page, etc.) of the merchant's commercial website. Also, the key files produced by the integration wizard that wrap all the API functionality in them are placed in the shopping cart web directory of the merchant's commercial website. Afterwards, the payment mechanism code will be successfully integrated into the merchant's commercial website.

Thus, the wizard presents contextual page flow and also generates code at the same time to enable the user to easily integrate an API-based payment mechanism.

Further limitations and disadvantages of conventional and traditional approaches will become apparent to one of skill in the art, through comparison of such systems with the present invention as set forth in the remainder of the present application and drawings.

BRIEF DESCRIPTION OF THE FIGURES

FIG. 7A is a screenshot of a page requesting API credentials, Shopping Cart Programming Language, a Return URL, a Cancel URL, the Payment Type and the Currency Code of a selected payment mechanism, according to another embodiment of the invention.

To allow cross-referencing among the figures, like elements in the figures are provided like reference numerals.

DETAILED DESCRIPTION

The following description is presented to enable any person skilled in the art to make and use the invention, and is provided in the context of particular applications of the invention and their requirements. Various modifications to the disclosed embodiments will be apparent to those skilled in the art and the general principles defined herein may be applied to other embodiments and applications without departing from the spirit and scope of the present invention.

According to one embodiment of the invention, a method is provided that enables an online merchant to seamlessly integrate payment mechanism code into their commercial website without having to understand the intricacies of an API or other code.

Figure 1:
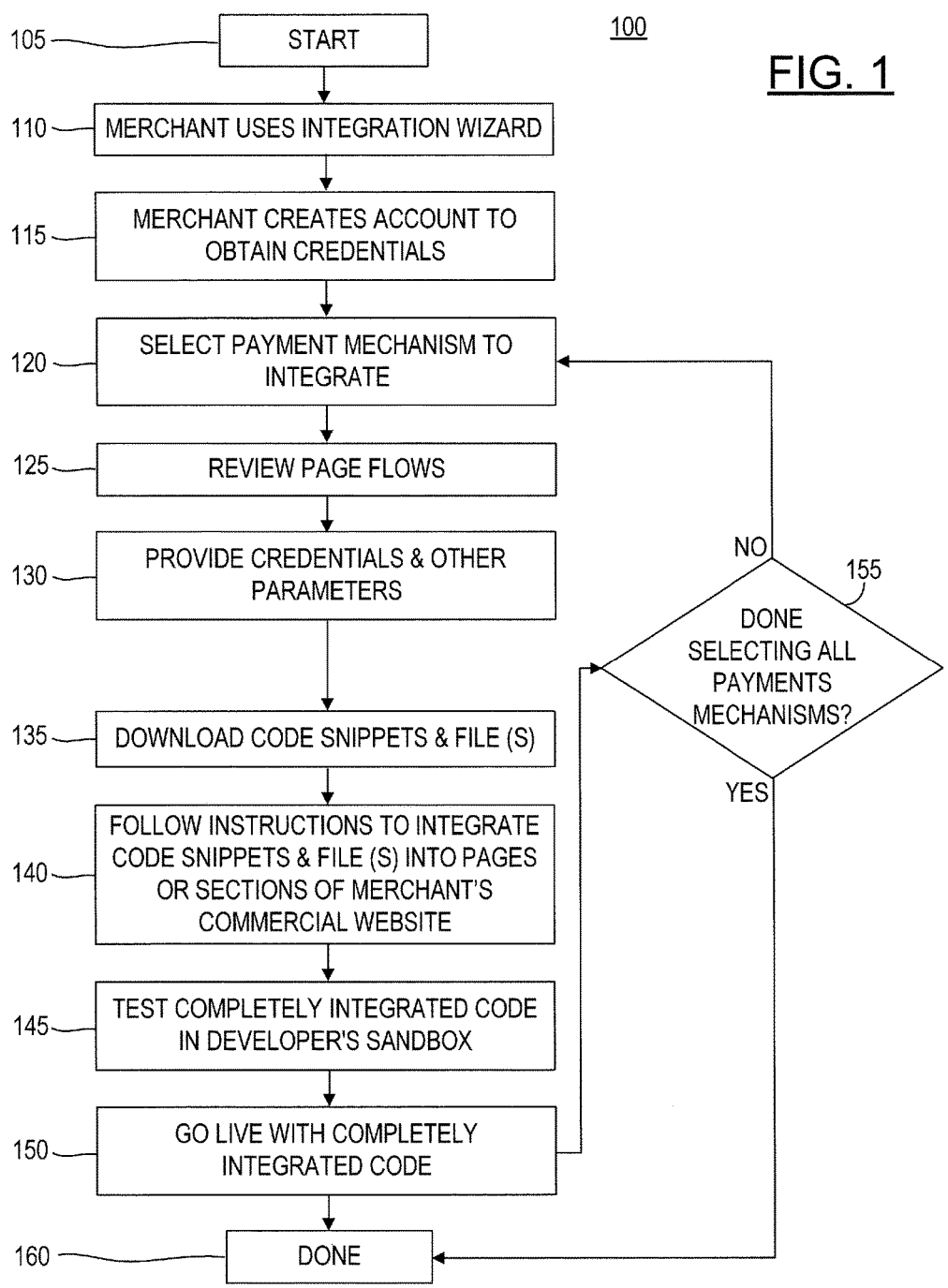
FIG. 1 is a flowchart illustrating a method of integrating a payment mechanism into a commercial website according to one embodiment of the invention.

FIG. 1 is a flowchart illustrating a method 100 of integrating a payment mechanism into a commercial website according to one embodiment of the invention. In the first step 110, a merchant visits an "Integration Wizard" website or uses an "Integration Wizard" program, both of which embody method 100. Wizards are well known in the industry.

Figure 2:
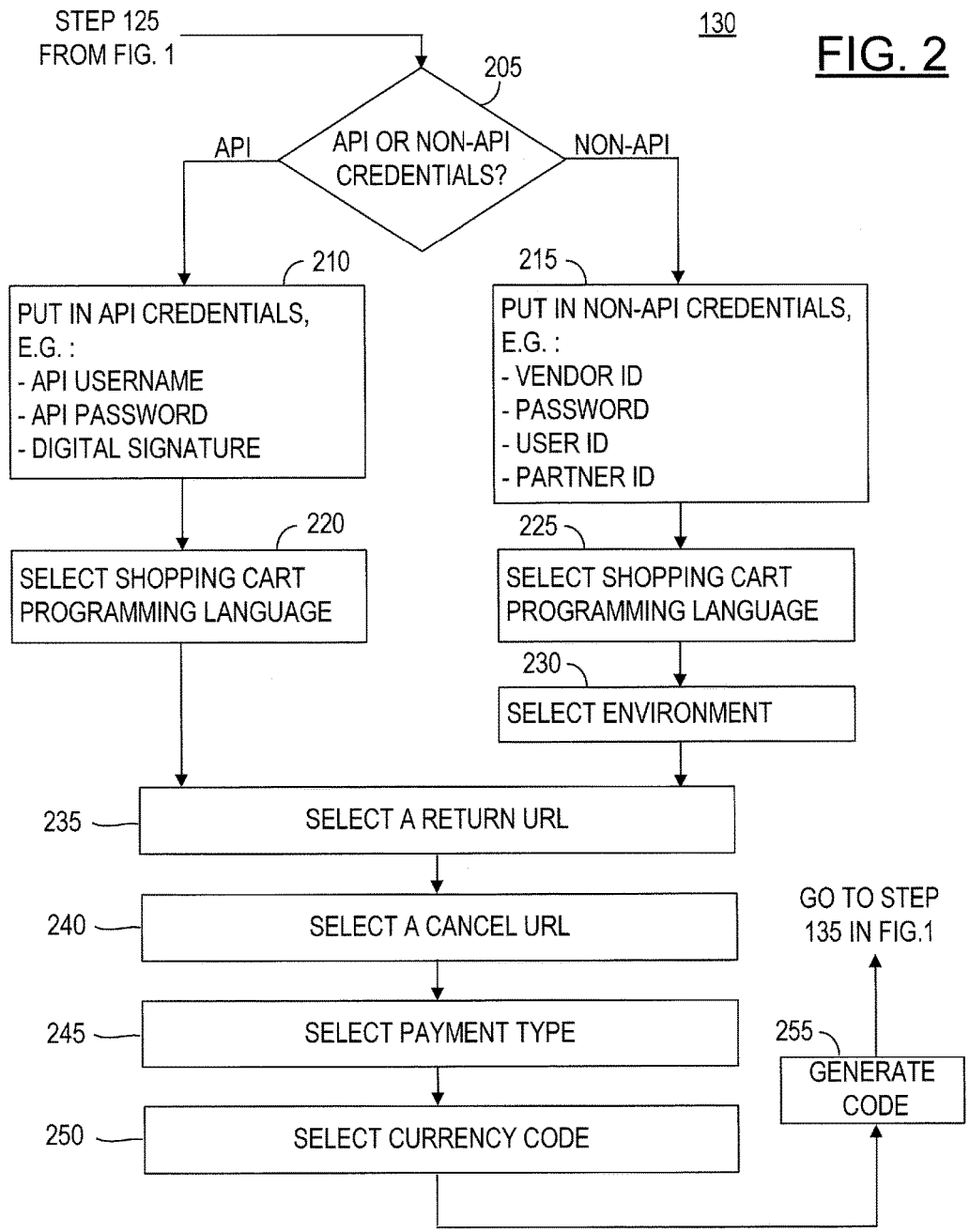
FIG. 2 is a flowchart showing sub-steps of one of the steps of the method shown in FIG. 1 according to one embodiment of the invention.

In step 115, a merchant creates either a sandbox account in order to acquire API credentials, such as an API username, API password and a signature or digital signature, which will be further explained in the description for FIG. 2. Also in step 115, a merchant can create a merchant or Payflow account to acquire Payflow credentials such as name, password, user or partner. Payflow credentials are simply examples of credentials that are not API credentials and are not limited to just Payflow credentials.

In step 120, a merchant selects a payment mechanism to integrate into his or her commercial website. A plurality of different payment mechanisms exist. One type of payment mechanism can, for instance, allows a customer to leave the merchant's commercial website and log-in to an external financial transaction website (such as, but not limited to, a PayPal login page) and send the payment back from the financial transaction program to the merchant's commercial website. Examples of these types of payment mechanisms include PayPal's Express Checkout (with a Developer Sandbox Account) product and PayPal's Express Checkout Pay-Flow edition (with a PayPal Merchant Account) product. Another type of payment mechanism allows a customer to make a payment to the merchant all without leaving the merchant's commercial website. An example of this type of payment mechanism includes PayPal's Credit Card Pay-Flow product (with a PayPal Merchant Account).

In step 125, once a payment mechanism is selected in step 120, the page flows of that respective selected payment mechanism are presented in order to educate the merchant on how a user proceeds from placing items in a shopping cart to checking out. This is done to establish a context with the merchant and to establish a common terminology for referring to different pages of the shopping cart site. For instance, there is a "Shopping Cart Page", a "Shipping Address Page", a "Billing Page", an "Order Review Page" and finally an "Order Confirmation Page". For a payment mechanism that requires a customer to leave a merchant's commercial website, there are two primary page flows that can be shown.

First, a page flow can be shown that details how a customer can proceed directly from the "Shopping Cart Page" of the merchant's commercial website to an external website of a financial transaction program (such as a PayPal login page) to provide their login data and pay for the purchased item through the financial transaction program (e.g. using PayPal funds, for instance). Then, the customer reviews the payment they made through their financial transaction program. Afterwards, the customer is brought back to an "Order Review Page" of the merchant's commercial website and then is taken to the "Order Confirmation Page" of the merchant's commercial website.

Second, another page flow can be shown that details how a customer can proceed from the "Shopping Cart Page" of the merchant's commercial website to the "Billing Page" of the merchant's commercial website and then to the an external website of a financial transaction program (such as a PayPal login page) to provide their login data and pay for the purchased item through the financial transaction program (e.g. using PayPal funds, for instance). Then, the customer reviews the payment they made through their financial transaction program. Afterwards, the customer is brought back to an "Order Review Page" of the merchant's commercial website and then is taken to the "Order Confirmation Page" of the merchant's commercial website.

Third, the merchant is shown that both of the above two page flows can be implemented for a payment mechanism that requires a customer to leave a merchant's commercial website to an external financial transaction program website.

Fourth, for a payment mechanism that enables a customer to stay at a merchant's commercial website the entire time, a simple direct page flow is presented that shows how a customer can proceed from the "Shopping Cart Page" of the merchant's commercial website, to the "Shipping Address Page", then to the "Billing Page," then the "Order Review Page" and then finally to the "Order Confirmation Page" all on the merchant's commercial website.

In step 130, a merchant provides API Credentials (e.g. API Username, API Password, Digital Signature) if the merchant signed up for an API Developer Account, or the merchant provides Payflow Credentials (e.g. Name, Password, User, Partner) if the merchant signed up for a non-API based account such as, for example, a PayPal Merchant Account or another similar type of account not affiliated with an API. The merchant also specifies additional parameters. The end result of step 130 is that code-snippets and file(s) get generated by the wizard from the API or Payflow Credentials and other parameter information that the merchant specifies.

In step 135, a merchant will have the downloaded code snippets and file(s) which were generated from step 130.

In step 140, a merchant follows the detailed instructions provided by the Integration Wizard that details how to integrate the downloaded code snippets and file(s) into the specific pages (e.g. the "Shopping Cart Page", the "Billing Page", the "Order Review Page" and the "Order Confirmation Page") of the merchant's commercial website. The end result of step 140 is that after following the instructions, a merchant will have the option of testing the integrated code in a sandbox or "going live" with the integrated code.

In step 145, a merchant then decides to test the integrated code in a developer's sandbox, if the merchant has already set up a Developer Sandbox account (with API Credentials). Afterwards, in step 150, a merchant may also decide to "go live" with the code, which basically means that the integrated code will be placed on the merchant's commercial website to be used by customers and the rest of the public.

In step 155, the merchant asks whether he or she wishes to integrate any additional payment mechanisms with the Integration Wizard. If there are still more payment mechanisms to integrate, the merchant proceeds back to step 120 and selects another payment mechanism to integrate into his or her commercial website. If the merchant does not want to integrate any more payment mechanisms and the "going live" of the last payment mechanism the merchant integrated into his or her commercial website was successful, the merchant is done with the process, and therefore, the merchant goes to step 160 to finish the entire integration process.

FIG. 2 is a flowchart showing details of step 130 of the integration method shown in FIG. 1 according to one embodiment of the invention.

Step 205 asks whether the merchant has set-up a Developer-Sandbox Account and therefore has API Credentials, or if the merchant has set-up a non-API Account such as a Payflow Account and has Payflow Credentials.

In step 210, if the merchant has a Developer-Sandbox Account, then the merchant has API Credentials such as an API Username, an API Password and a Signature (or Digital Signature). Therefore, in step 210, a merchant inputs his or her API Credentials (API Username, API Password, Signature) into the Integration Wizard.

In step 215, if the merchant has a non-API based Account or a Payflow Account, then the merchant has Payflow Credentials such as ID data for: Vendor, Password, User, and Partner. The Vendor (ID) is the login name created when the merchant registered for the Account. The Password is the password for the account. The User (ID) should be the same as the "Vendor" (ID) unless a separate user was created. For instance, if the merchant is using PayPal, a separate user can be created for the PayFlow Pro product from within the merchant's PayPal Manager Account. Finally, the Partner (ID) is applicable if the merchant is using PayPal. The Partner ID for PayPal is the ID provided to the merchant by the authorized PayPal Reseller who registered the merchant for the PayFlow Pro service. If the merchant purchased the PayPal Merchant Account directly from PayPal, then "PayPal" is input as the Partner ID. The Partner ID value is case-sensitive.

In step 220 and step 225, the merchant selects the Shopping Cart Programming Language that the merchant wishes to code the Shopping Cart files in. This code is usually what the rest of the merchant's commercial website is coded in. The Shopping Cart Programming Language can comprise, but is not limited to: Active Server Pages (ASP), ASP.NET (ASPX), Java Server Pages (JSP), Java (or Java SDK) or PHP.

In step 230, if the merchant has a non-API based Account or a Payflow Account, then the merchant can select the "Environment" of the integrated code, which usually comprises either "Pilot", for testing purposes, or "Live" which means that the integrated code will automatically be integrated into the actual, live version of the merchant's commercial website available on the internet.

In step 235, the merchant provides a "Return URL". A "Return URL" is usually the "Order Review Page" of the merchant's commercial website, and is the website that a customer "returns" to after visiting an external financial transaction website such as PayPal. For instance, if the merchant's commercial website is coded in HTML, the Return URL may be: www.yourstore.com/OrderConfirmPage.htm.

In step 240, the merchant provides a "Cancel URL". A "Cancel URL" is usually the "Main Page" of the merchant's commercial website, and is the website that a customer is brought to after cancelling an order. For instance, if the merchant's commercial website is coded in HTML, the Cancel URL may be: www.yourstore.com/MainPage.htm.

In step 245, the merchant selects a "Payment Type". If the merchant is using PayPal, the Payment Type is an input to the Payflow Gateway that allows a merchant to determine when to actually charge the customer or purchaser's PayPal or credit card account. PayPal currently supports two different Payment Types.

The first Payment Type is "Sale" which means that the funds are credited to the merchant's account immediately at the end of the checkout flow, or right after the customer or purchaser finishes the checkout process of web pages. The second Payment Type is "Authorization" which means that the merchant obtains an authorization (or a hold) for the transaction amount and the merchant then captures the funds against this authorization at a later date. Authorizations are valid for specific amounts of time, such as up to three days. The fund capture can be done either from the PayPal account or by using a function in the API called "DoCapture".

In step 250, the merchant selects a "Currency Code". The "Currency Code" can comprise, but is not limited to: U.S. Dollar [USD], Australian Dollar [AUD], Canadian Dollar [CAD], Swiss Franc [CHF], Czech Koruna [CZK], Danish Krone [DKK], Euro [EUR], Pound Sterling [GBP], Hong Kong Dollar [HKD], Hungarian Forint [HUF], Japanese Yen [JPY], Norwegian Krone [NOK], New Zealand Dollar [NZD], Polish Zloty [PLN], Swedish Krona [SEK], and the Singapore Dollar [SGD]. This is the currency that the customer or purchaser will use to pay the merchant for the product, or the currency that the merchant has decided to accept on his or her commercial website.

Finally, in step 255, all the inputted parameters from steps 205 to 250 are taken and placed into a code generator. In step 255, the code generator in turn generates code snippets and file(s) tailored to the parameters input in steps 205 to 250. For instance, code snippets are generated that swap in the "Return URL" and "Cancel URL" in the appropriate locations. Also in the code snippets, the "Payment Type" and "Currency Code" information is properly reflected. Finally, the file(s) that a merchant usually places in the shopping cart web directory are generated, in the "Shopping Cart Programming Language" that the merchant selected in steps 220 and 225 (e.g. either ASP, ASPX, JSP, Java, PHP or another language). After the code snippets and file(s) have been generated, the merchant then proceeds to step 135 in FIG. 1.

Figure 3:
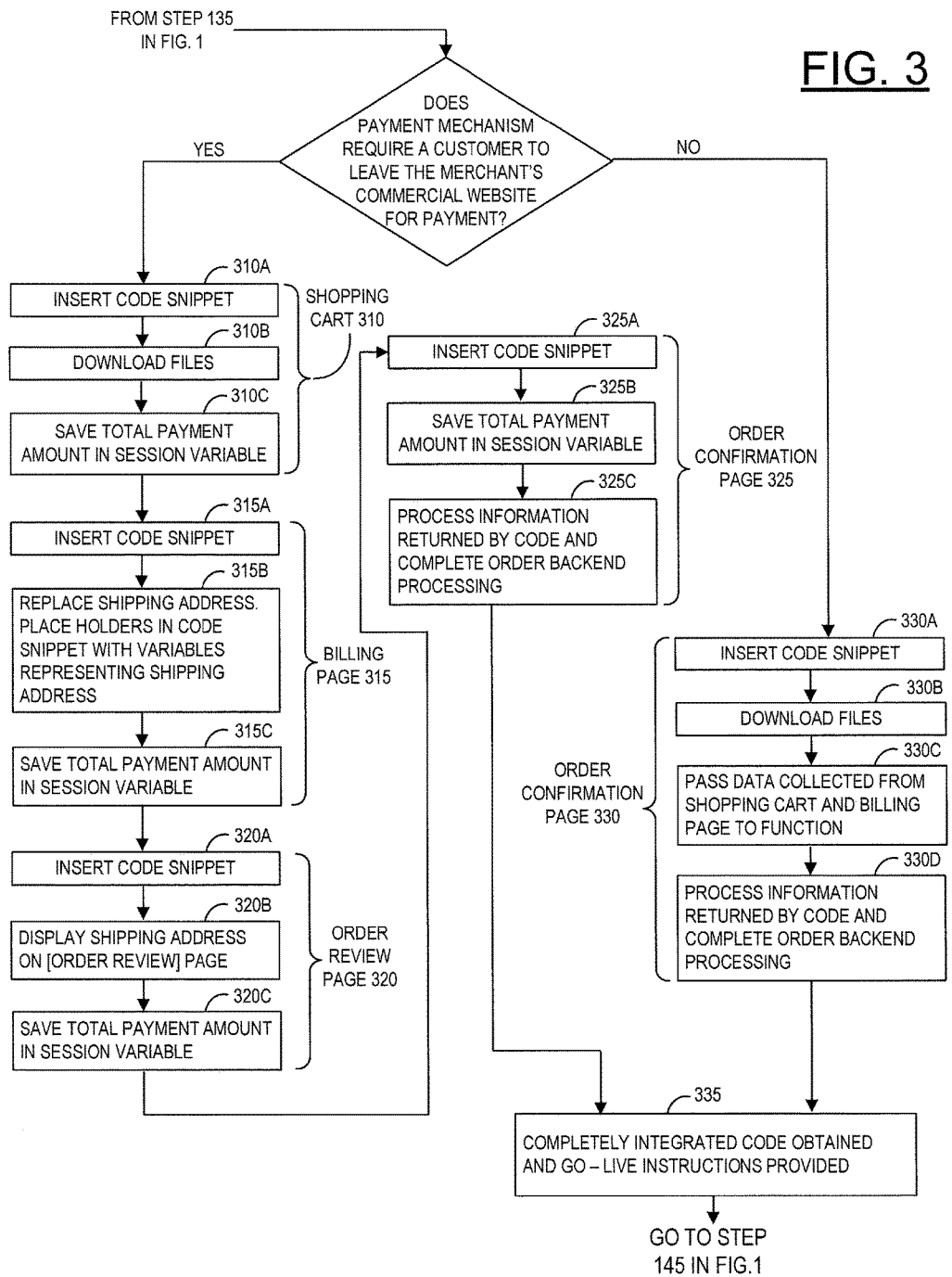
FIG. 3 is a flowchart showing sub-steps of another one of the steps of the method shown in FIG. 1 according to one embodiment of the invention.

FIG. 3 is a flowchart showing details of step 140 of the integration method shown in FIG. 1 according to one embodiment of the invention. In step 305, the merchant is asked: "Does Payment Mechanism [selected payment mechanism] Require a Customer to Leave the Merchant's Commercial Website for Payment?" If the answer to this question is YES, then the payment mechanism likely is integrated with a Shopping Cart Page, a Billing Page, an Order Review Page and an Order Confirmation Page. If the answer to this question is NO, then the payment mechanism is integrated only with an Order Confirmation Page.

Assuming the answer to the question posed in step 305 is YES, step 310 involves the instructions to be followed for integrating code into the "Shopping Cart Page" of a merchant's commercial website. In step 310A, the merchant takes the downloaded code snippet, generated according to the parameters specified in step 130 of FIG. 1, and places that code snippet into the "Shopping Cart Page" of the merchant's commercial website code. Then, in step 310B, the merchant downloads the respective file(s) and places the file(s) into the shopping cart web directory of his or her commercial website. What language these files show up in depends on what language was specified as the "Shopping Cart Programming Language" in steps 220 and 225 of FIG. 2. If ASP, JSP, Java or PHP were selected, then there will usually be two ASP, JSP, Java or PHP files, respectively, that will be generated and that will need to be placed in the shopping cart web directory of the merchant's commercial website. If ASPX was selected, there will be five files: two ".aspx" files and three ".aspx.cs" files. A different number of files will be generated if a different type of language, not specified above, is selected. Finally, in step 310C, the merchant saves the total payment amount in a session variable named "Payment_Amount". The code in the generated file(s) is designed to read from this session variable and pass this variable as input to an API function call.

In step 315, instructions are outlined for integrating code into the "Billing Page" of a merchant's commercial website. In step 315A, the merchant inserts the downloaded code snippet into the "Billing Page" section of the merchant's commercial website, or the section of the merchant's commercial website that handles billing. In step 316B, the code snippet has a variety of "shipping address placeholders" e.g. <<ShipToName>>, <<ShipToStreet>>, <<ShipToCity>>, <<ShiftToState>>, etc. The merchant replaces these placeholders with variables representing the shipping address, which are usually provided in the API library. Finally, in step 315C, the merchant saves the total payment amount (a numerical amount) in a session variable named "Payment_Amount". The code inside the files described in step 310 is designed to read from this session variable and pass this value as input to an API function call.

In step 320, instructions are outlined for integrating code into the "Order Review Page" of a merchant's commercial website. In step 320A, the merchant inserts the downloaded code snippet into the "Order Review" page of the merchant's commercial website. In step 320B, the merchant displays the shipping address returned by the code variables directly on the "Order Review" page for the customer to review. In step 320C, the merchant saves the total payment amount (a numerical value) in a session variable named "Payment_Amount". The code inside the files described in step 310 is designed to read from this session variable and pass this value as input to an API function call.

In step 325, instructions are outlined for integrating code into the "Order Confirmation Page" of a merchant's commercial website, if the selected payment mechanism at issue requires a customer to leave the merchant's commercial website for payment (e.g. a "YES" to the question posed in step 305). In step 325A, the merchant inserts the downloaded code snippet into the "Order Confirmation Page" of the merchant's commercial website. Then, in step 325B, the merchant saves the total payment amount (a numerical value) in a session variable named "Payment_Amount". The code inside the files described in step 310 are designed to read from this session variable and pass this value as input to an API function call. Finally, in step 325C, the merchant processes the information returned by the code snippet of step 325A and completes order backend processing.

In step 330, instructions are outlined that are to be followed for integrating code into the "Order Confirmation Page" of a merchant's commercial website, if the selected payment mechanism at issue does not require a customer to leave the merchant's commercial website for payment (e.g. a "NO" to the question posed in step 305). In step 330A, the merchant inserts the downloaded code snippet into the "Order Confirmation Page" of the merchant's commercial website. Then, in step 330B, because the merchant has not downloaded any file(s) yet (because a merchant only downloads file(s) in step 310B if he answers "YES" to the question in step 305 and then goes to step 310), the merchant will have to download the generated files from the parameters specified in FIG. 2. Then, in step 310C the merchant passes the data collected from the "Billing Page" of the merchant's commercial website to the "DirectPayment" function in one of the downloaded files, if PayPal is used. Finally, in step 310D, the merchant processes the information returned by the code snippet in step 330A and completes order backend processing.

Finally, in step 335, the merchant is finished with integrating the code into all relevant pages or sections of his or her commercial website.

Also in step 335, a completion page will appear that will tell the merchant instructions on how to test the integrated code and how to "go live" by executing the integrated code on the actual, live version of the merchant's commercial website. After step 335, the process goes to step 145 in FIG. 1.

According to another embodiment of the invention, a website integration system is provided that enables a merchant to seamlessly integrate payment mechanism code into their commercial website without having to understand an intricate API or other code.

Figure 4:
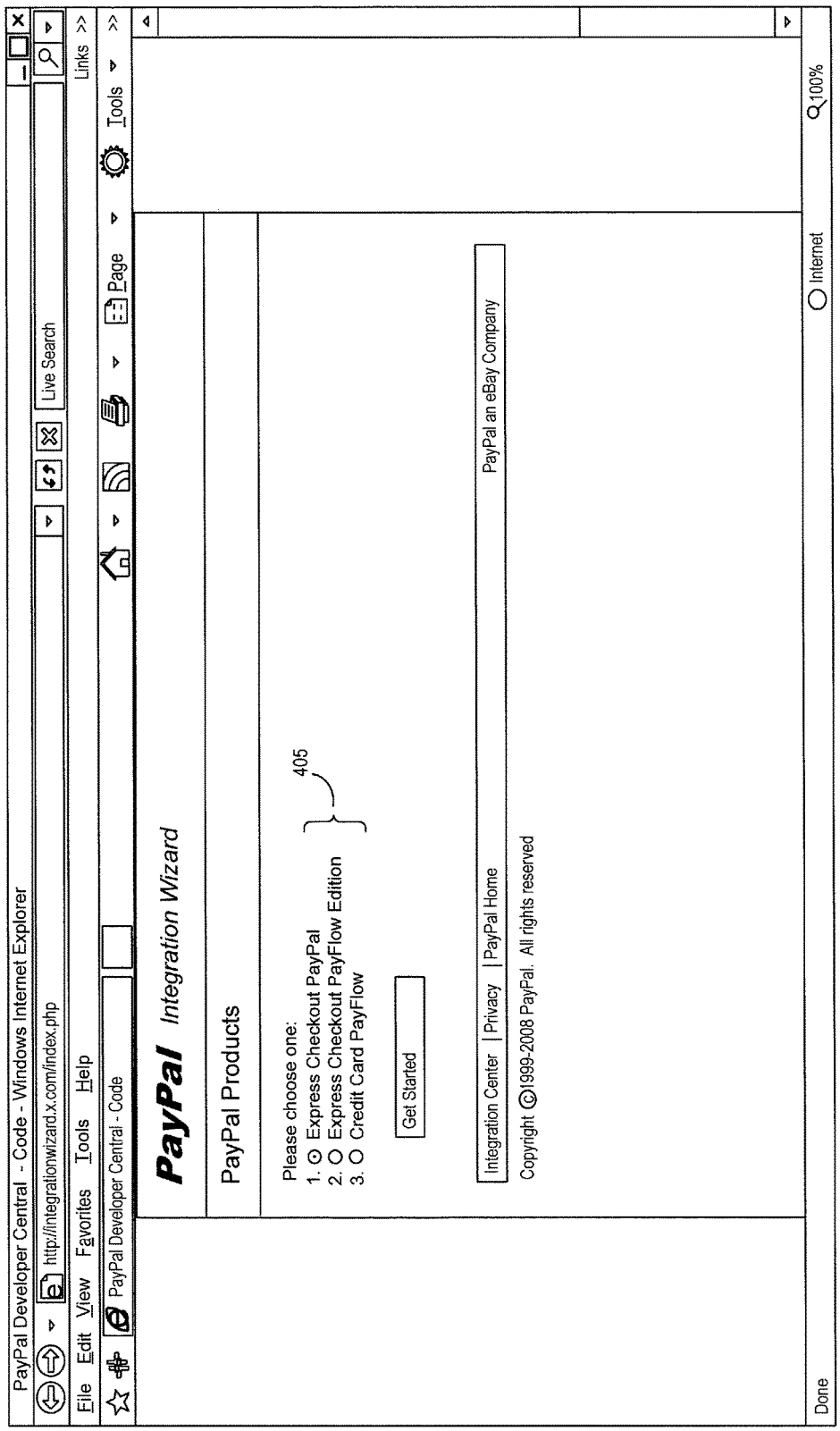
FIG. 4 is a screenshot of a "Payment Mechanism Select" page of the Integration Wizard System according to another embodiment of the invention.

FIG. 4 is a screenshot of a "Payment Mechanism Select" page of the Integration Wizard System according to another embodiment of the invention. Payment mechanism list 405 lists the different payment mechanisms that a merchant can select. Although in this particular Integration Wizard there are only three—Express Checkout PayPal, Express Checkout PayFlow Edition and Credit Card PayFlow—the invention is not limited to just these three payment mechanisms and there can be more.

Figure 5A:
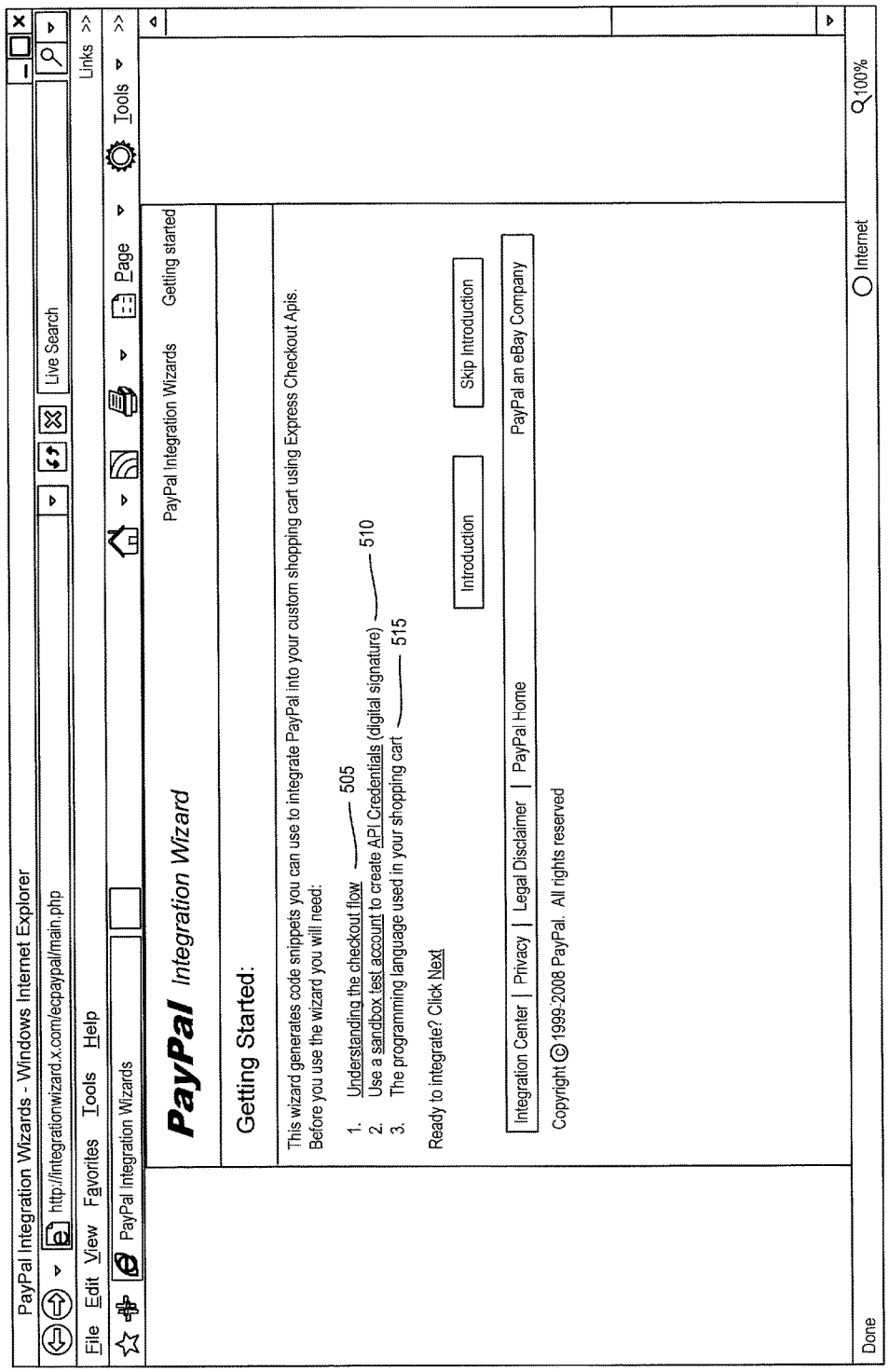
FIG. 5A is a screenshot of a "Getting Started" or overview page for one selected payment mechanism, according to another embodiment of the invention.

FIG. 5A is a screenshot of a "Getting Started" or overview page for one selected payment mechanism, according to another embodiment of the invention. Page Flow Notice 505 provides a link to the merchant for understanding the checkout page flow of the particular payment mechanism (in this case, Express Checkout PayPal), and provides a link to the tutorial page showing the page flows. Sandbox and API Credentials Notice 510 informs the merchant on how to create a sandbox test account and obtain API Credentials. If the merchant clicks the text "sandbox test account" he or she is brought to the website developer.paypal.com to set up a developer account. If the merchant clicks the text "API Credentials", a help box appears, which will be detailed in FIG. 5B. Programming Language Notice 515 informs the merchant that he or she has to know the programming language used in the shopping cart on the merchant's commercial website (e.g. usually ASP, ASPX, JSP, Java, PHP or another language, as described above).

Figure 5B:
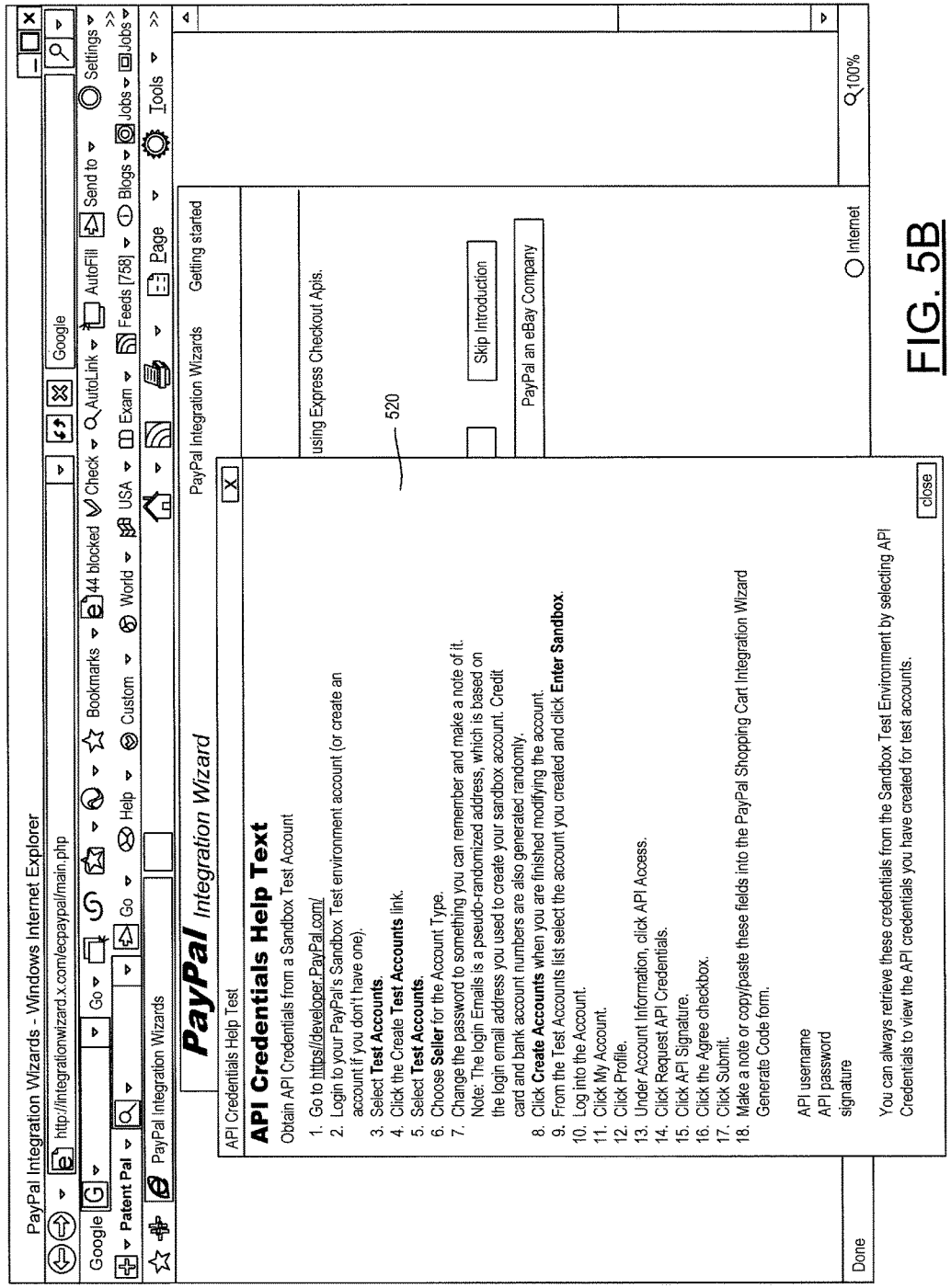
FIG. 5B is a screenshot of a "Getting Started" or overview page for one selected payment mechanism showing a "help box", according to another embodiment of the invention.

FIG. 5B is a screenshot of a "Getting Started" or overview page for one selected payment mechanism showing a "help box", according to another embodiment of the invention. API Credentials Help Box 520 describes to the merchant how to open a Sandbox Test Account and how to obtain API Credentials (API username, API password, signature) with step-by-step instructions.

Figure 5C:
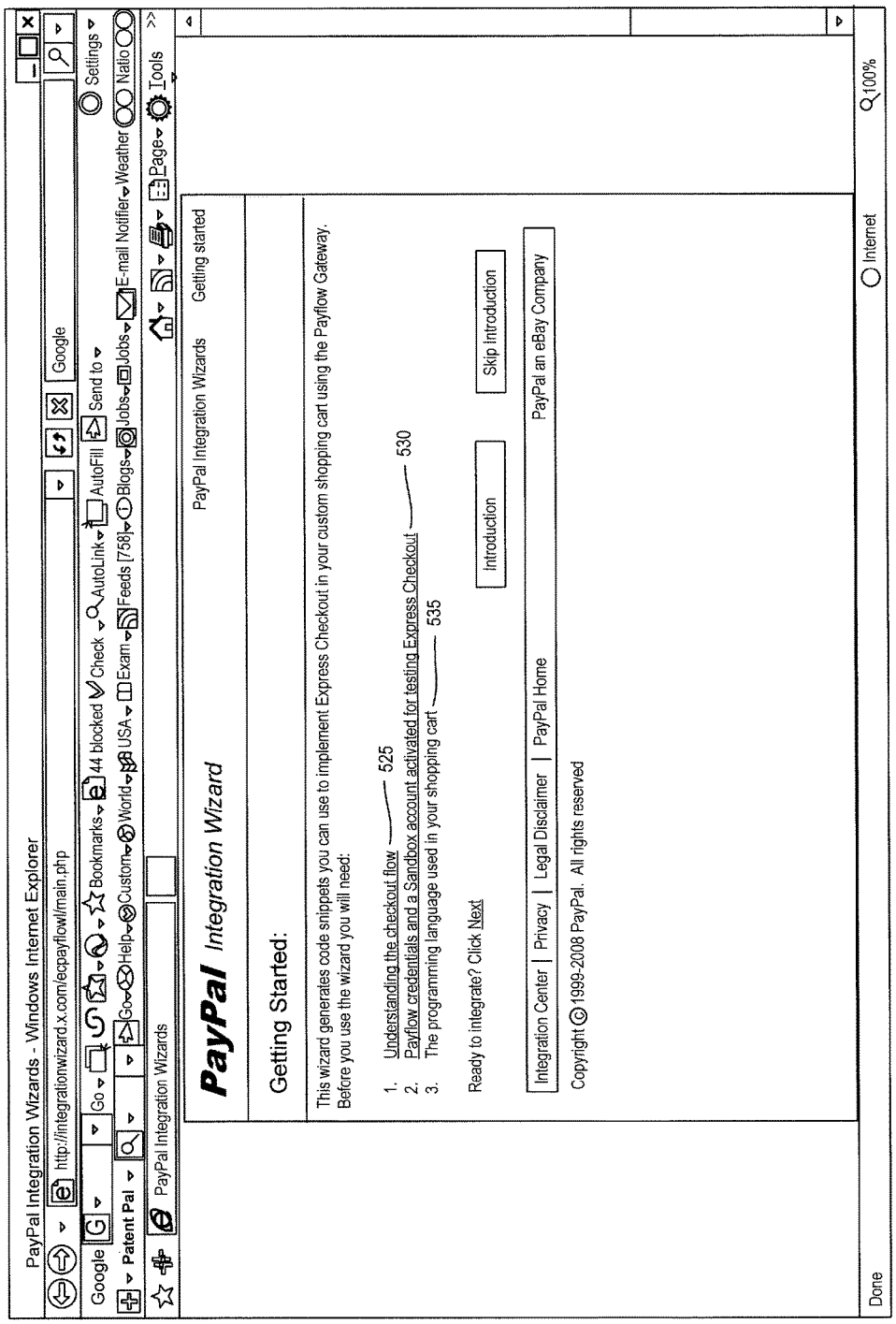
FIG. 5C is a screenshot of a "Getting Started" or overview page for another selected payment mechanism, according to another embodiment of the invention.

FIG. 5C is a screenshot of a "Getting Started" or overview page for another selected payment mechanism, according to another embodiment of the invention. Page Flow Notice 525 provides a link to the tutorial page showing the page flows for the particular payment mechanism (in this case, Express Checkout PayFlow Edition).

Sandbox and Payflow Credentials Notice 530 informs the merchant on how to create a sandbox test account and obtain Payflow Credentials. If the merchant clicks the text "Payflow credentials and a Sandbox account activated for testing Express Checkout", a help box appears, which will be detailed in FIG. 5D. Programming Language Notice 515 informs the merchant that he or she has to know the programming language used in the shopping cart on the merchant's commercial website (e.g. usually ASP, ASPX, JSP, Java, PHP or another language, as described above).

Figure 5D:
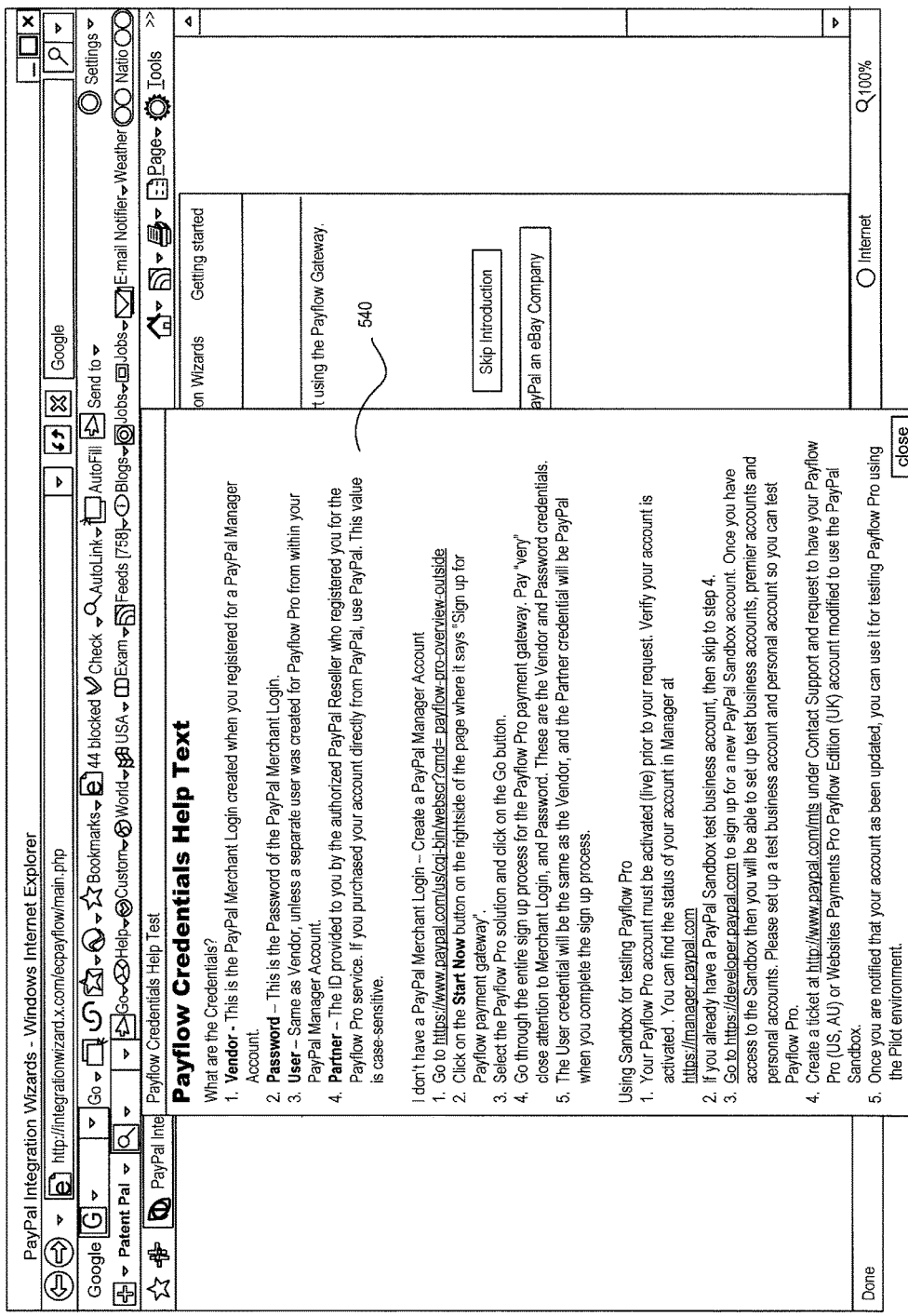
FIG. 5D is a screenshot of a "Getting Started" or overview page for another selected payment mechanism showing a "help box", according to another embodiment of the invention.

FIG. 5D is a screenshot of a "Getting Started" or overview page for another selected payment mechanism showing a "help box", according to another embodiment of the invention. Payflow Credentials Help Box 540 describes to the merchant how to open up a PayPal Merchant account, how to obtain Payflow Credentials (Vendor, Password, User, Partner), and how to use a Sandbox for testing Payflow Pro with step-by-step instructions.

Figure 5E:
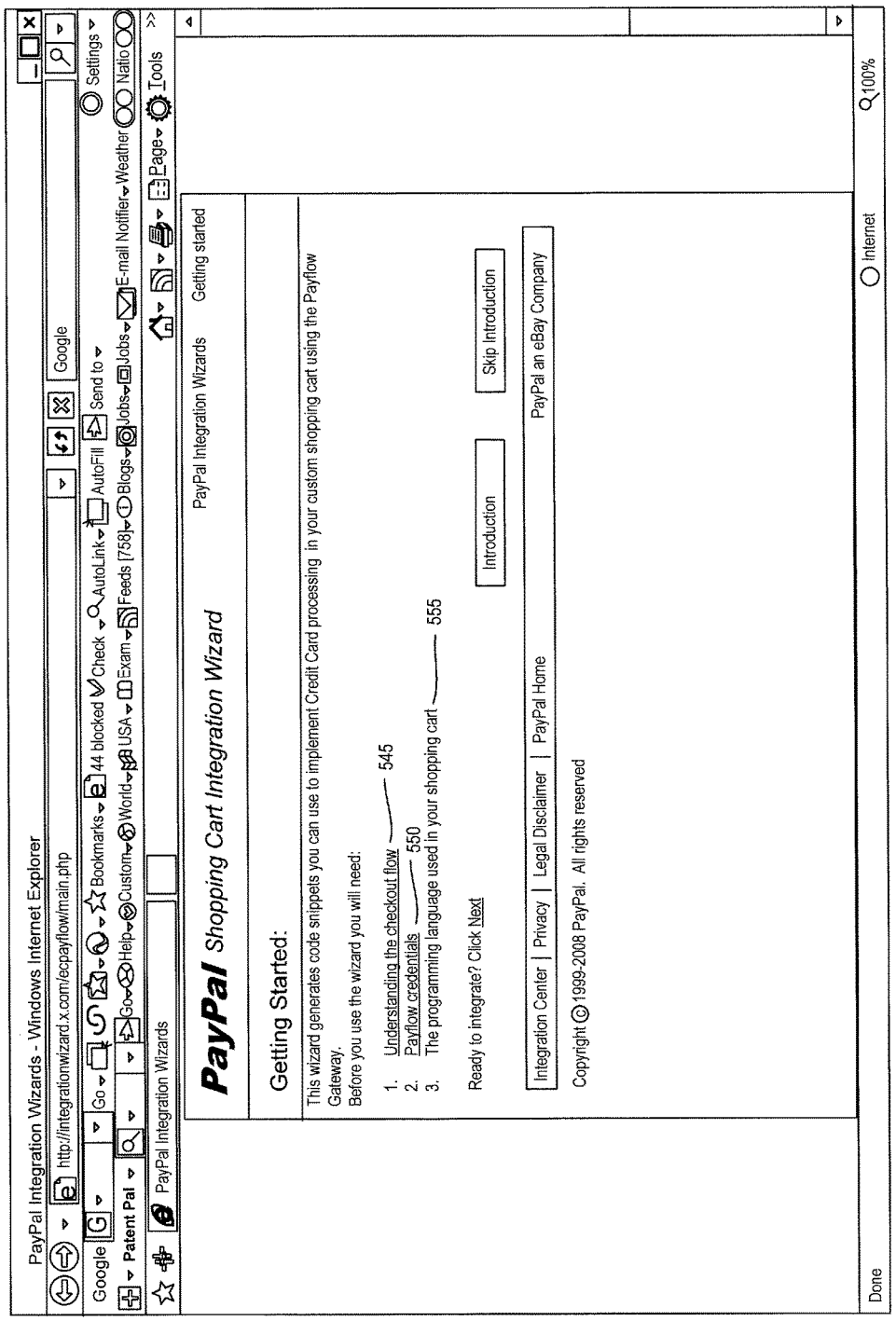
FIG. 5E is a screenshot of a "Getting Started" or overview page for yet another selected payment mechanism, according to another embodiment of the invention.

FIG. 5E is a screenshot of a "Getting Started" or overview page for yet another selected payment mechanism, according to another embodiment of the invention. Page Flow Notice 545 provides a link to the tutorial page showing the page flows for the particular payment mechanism (in this case, Credit Card PayFlow). Payflow Credentials Notice 550 informs the merchant on how to obtain Payflow Credentials. If the merchant clicks the text "Payflow credentials", a help box appears, which will be detailed in FIG. 5F. Programming Language Notice 555 informs the merchant that he or she has to know the programming language used in the shopping cart on the merchant's commercial website (e.g. usually ASP, ASPX, JSP, Java, PHP or another language, as described above).

Figure 5F:
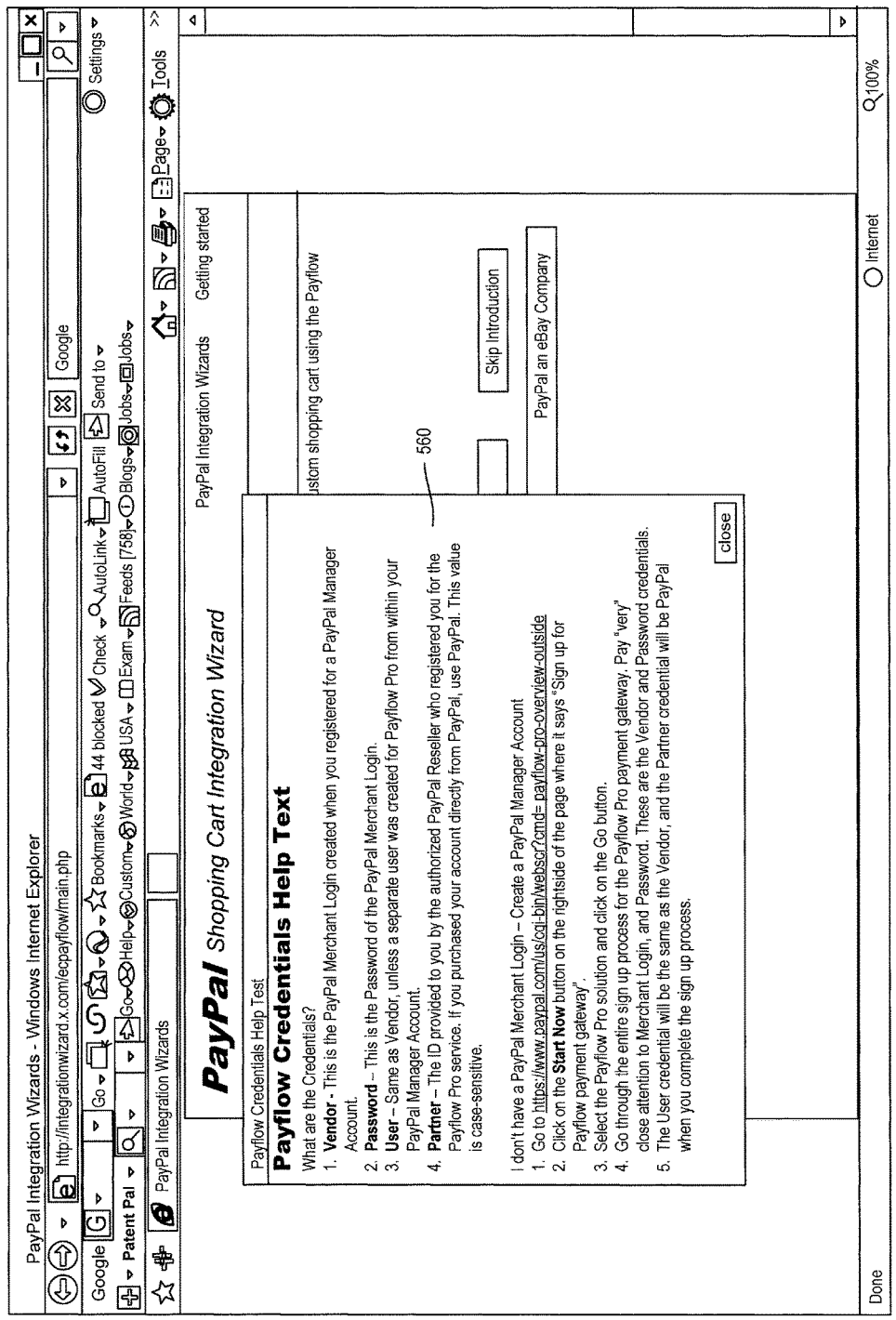
FIG. 5F is a screenshot of a "Getting Started" or overview page for yet another selected payment mechanism showing a "help box", according to another embodiment of the invention.

FIG. 5F is a screenshot of a "Getting Started" or overview page for yet another selected payment mechanism showing a "help box", according to another embodiment of the invention. Short Payflow Credentials Help Box 560 describes to the merchant how to open up a PayPal Merchant account and how to obtain Payflow Credentials (Vendor, password, User, Partner) with step-by-step instructions.

Figure 6A:
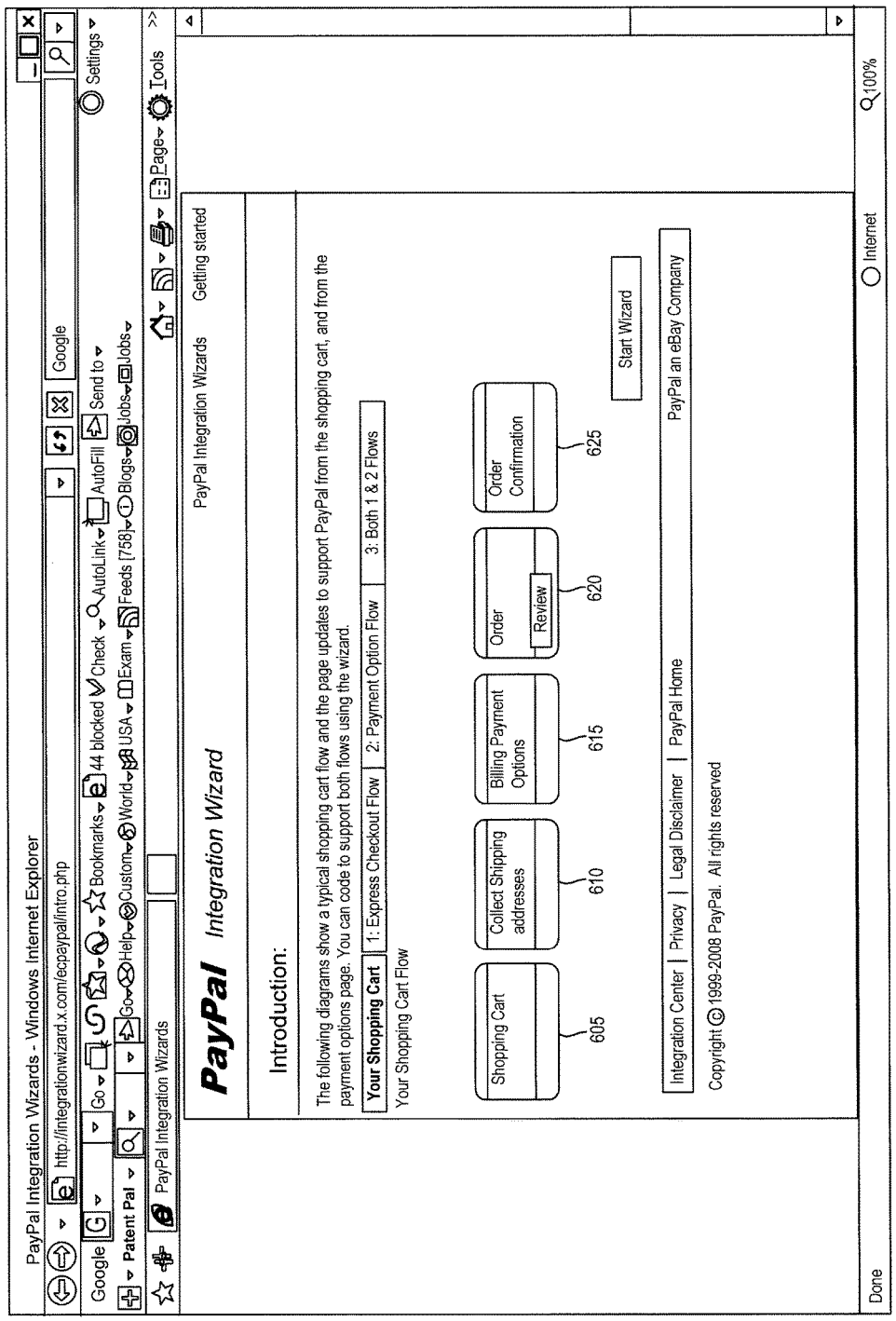
FIG. 6A is a screenshot of a first tutorial "page flow" page, educating the merchant on the page flow of the "shopping cart" aspect of a selected payment mechanism, according to another embodiment of the invention.

FIG. 6A is a screenshot of a first tutorial "page flow" page, educating the merchant on the page flow of the "shopping cart" aspect of a selected payment mechanism, according to another embodiment of the invention. The first tutorial page flow shows how a shopping cart works where the customer stays on the merchant's commercial website the entire time. Shopping Cart Page 605 is where the customer selects products and puts them into a shopping cart. Shipping Address Page 610 is where the customer specifies his or her shipping address. Billing Page 615 is where the customer chooses a payment method (e.g. credit card, debit card or PayPal) to pay for the purchase.

Order Review Page 620 is where the customer reviews his or her order. Order Confirmation Page 625 is where the order has been finalized and submitted and a confirmation page is generated for the customer's records. Usually, a confirmation number of some sort is provided to the customer at the Order Confirmation Page 625.

Figure 6B:
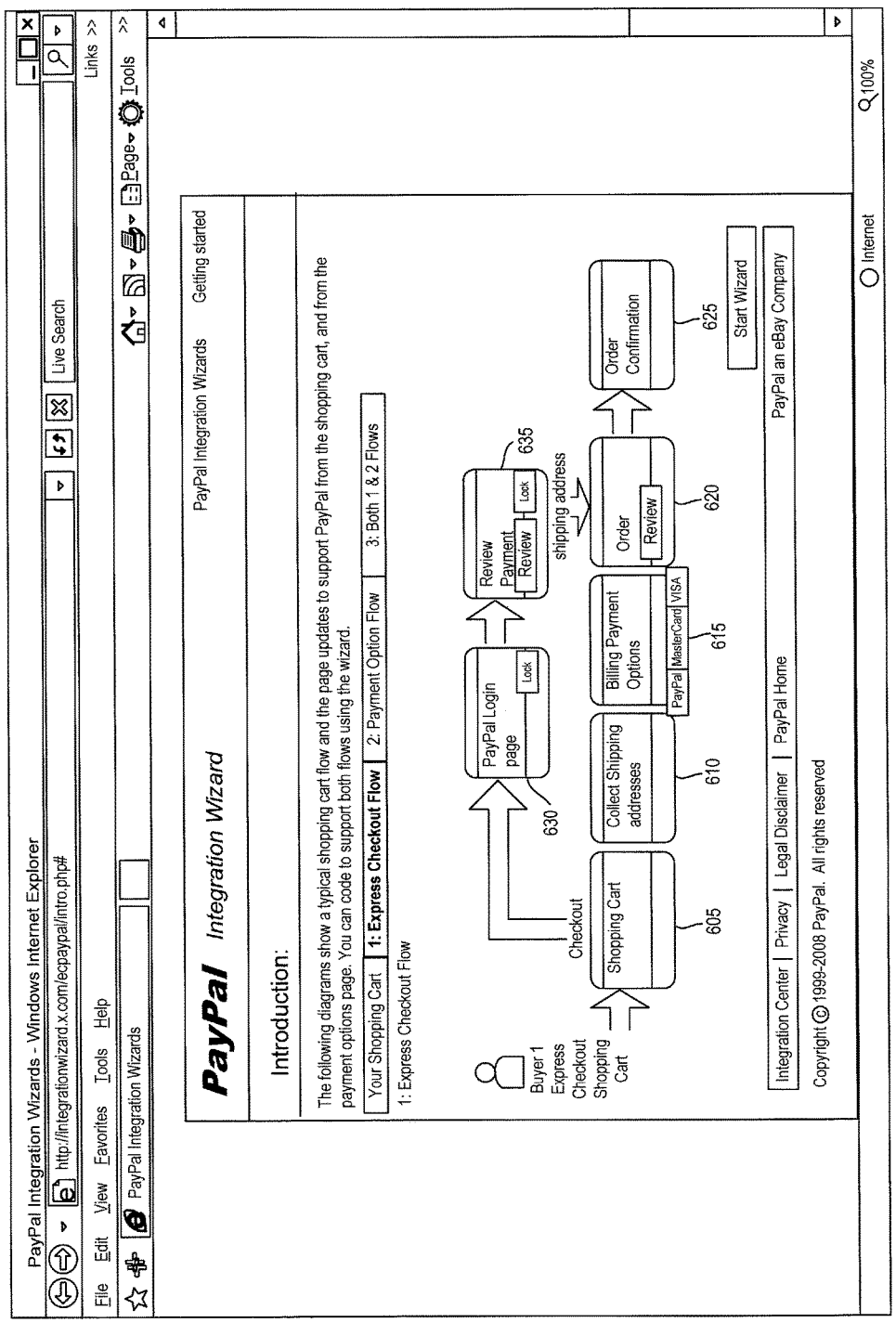
FIG. 6B is a screenshot of a second tutorial "page flow" page, educating the merchant on the page flow of the "Express Checkout" aspect of a selected payment mechanism, according to another embodiment of the invention.

FIG. 6B is a screenshot of a second tutorial "page flow" page, educating the merchant on the page flow of the "Express Checkout" aspect of a selected payment mechanism (here, either Express Checkout PayPal or Express Checkout PayFlow Edition), according to another embodiment of the invention. The second tutorial page flow shows how a customer can proceed directly from the Shopping Cart Page 605 to an external financial transaction website, such as the PayPal Login Page 630. There, the customer inputs his PayPal username and password to log-in to PayPal. The customer's PayPal account should also have several shipping addresses on file and adequate funds to pay for the purchase, so there is no need to enter the Shipping Address information in the Shipping Address Page 610 or enter a credit card or debit card on the Billing Page 615. Going to a PayPal Login Page 630 circumvents having to go through the Shipping Address Page 610 and Billing Page 615. After the customer has paid for the purchase after logging in through PayPal Login Page 630, the customer reviews the payment on PayPal Review Payment Page 635. Then, the shipping address information and payment information from PayPal are forwarded from the PayPal site back to the merchant's commercial website, and the customer then returns to the Order Review Page 620 of the merchant's commercial website to review his or her order. Then, the customer proceeds to the Order Confirmation Page 625 to receive confirmation that the order has been sent.

Figure 6C:
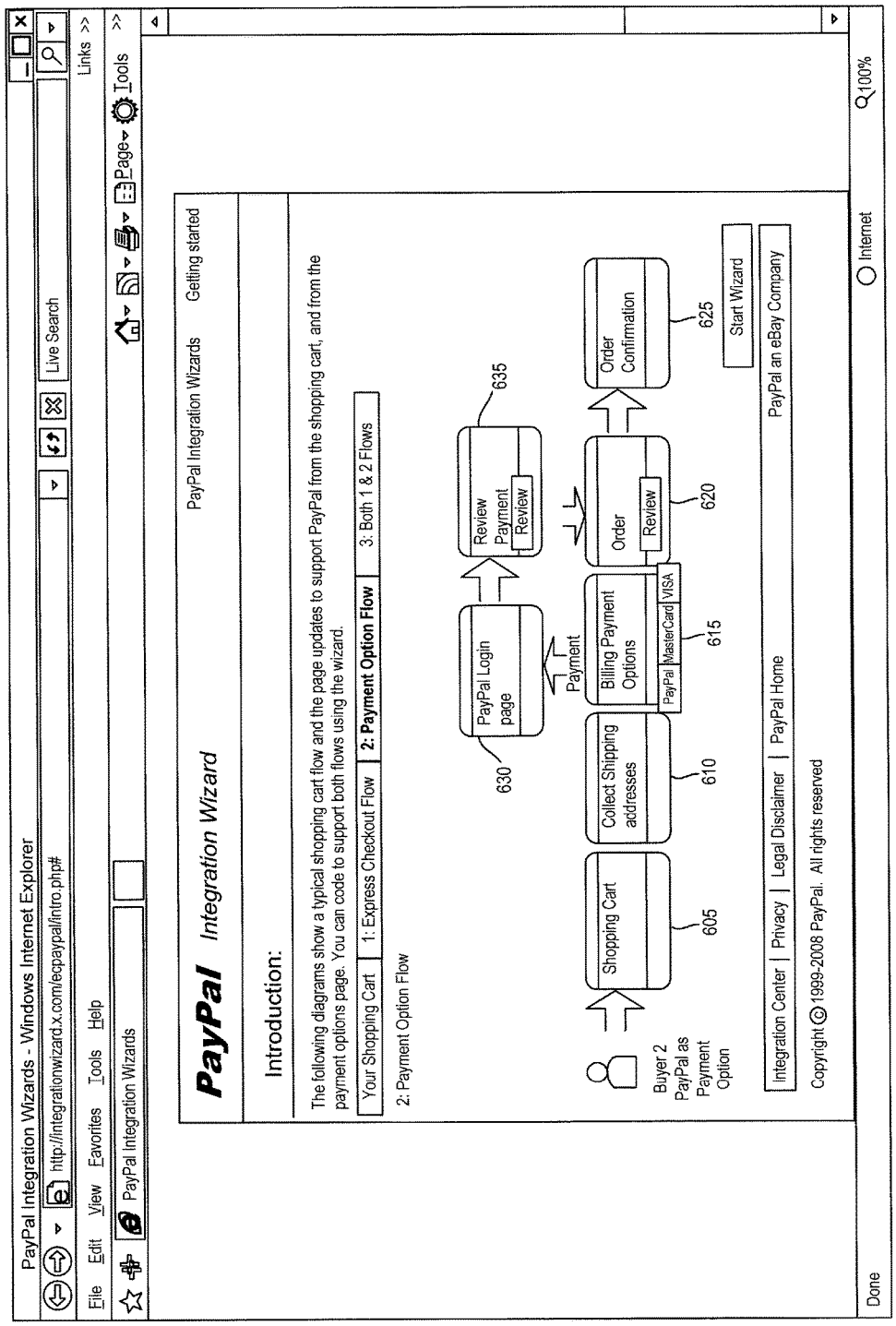
FIG. 6C is a screenshot of a third tutorial "page flow" page, educating the merchant on the page flow of the "Payment Option" aspect of a selected payment mechanism, according to another embodiment of the invention.

FIG. 6C is a screenshot of a third tutorial "page flow" page, educating the merchant on the page flow of the "Payment Option" aspect of a selected payment mechanism (here, either Express Checkout PayPal or Express Checkout PayFlow Edition), according to another embodiment of the invention. The third tutorial page flow shows how a customer goes from the Shopping Cart Page 605 to the Shipping Address Page 610 to enter a shipping address, and then to the Billing Page 615 to choose a payment method. If the customer chooses a financial transaction program such as PayPal as the payment method, the customer can then go to PayPal Login Page 630, enter his or her username and password, pay for the purchase with PayPal funds and then review the purchase on the PayPal Review Payment Page 635. Then, the customer is brought back to Order Review Page 620 of the merchant's commercial website and finally goes to Order Confirmation Page 625 to receive confirmation that the order has been sent.

Figure 6D:
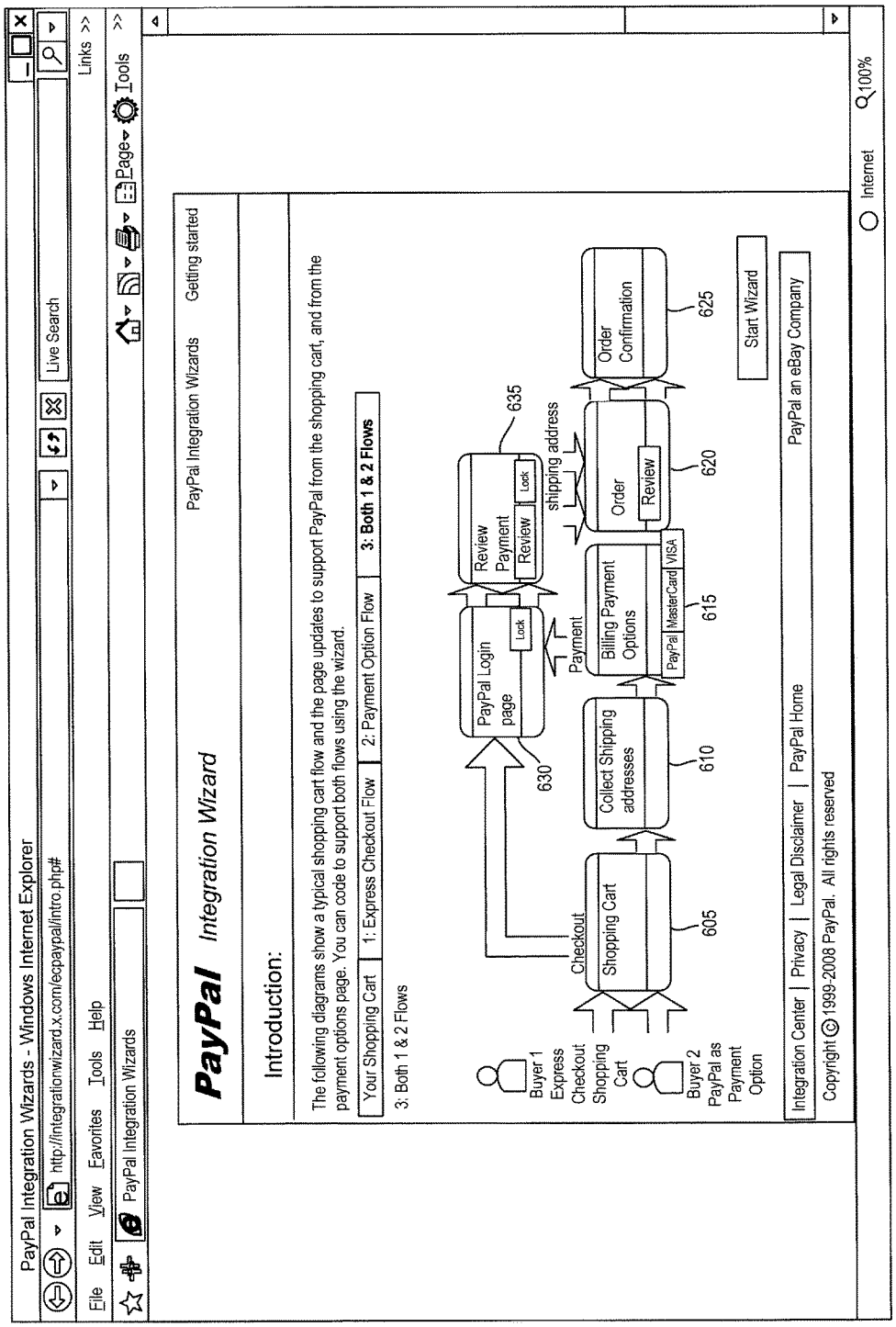
FIG. 6D is a screenshot of a fourth tutorial "page flow" page, educating the merchant on the page flow of the "Express Checkout" and "Payment Option" aspects, combined, of a selected payment mechanism, according to another embodiment of the invention.

FIG. 6D is a screenshot of a fourth tutorial "page flow" page, educating the merchant on the page flow of the "Express Checkout" and "Payment Option" aspects, combined, of a selected payment mechanism (here, either Express Checkout PayPal or Express Checkout PayFlow Edition), according to another embodiment of the invention. Basically, these are the two page flows described in FIG. 6B and FIG. 6C combined into one. The purpose of this tutorial is to educate the merchant on the fact that both flows are available and can be used with the selected payment mechanism.

Figure 6E:
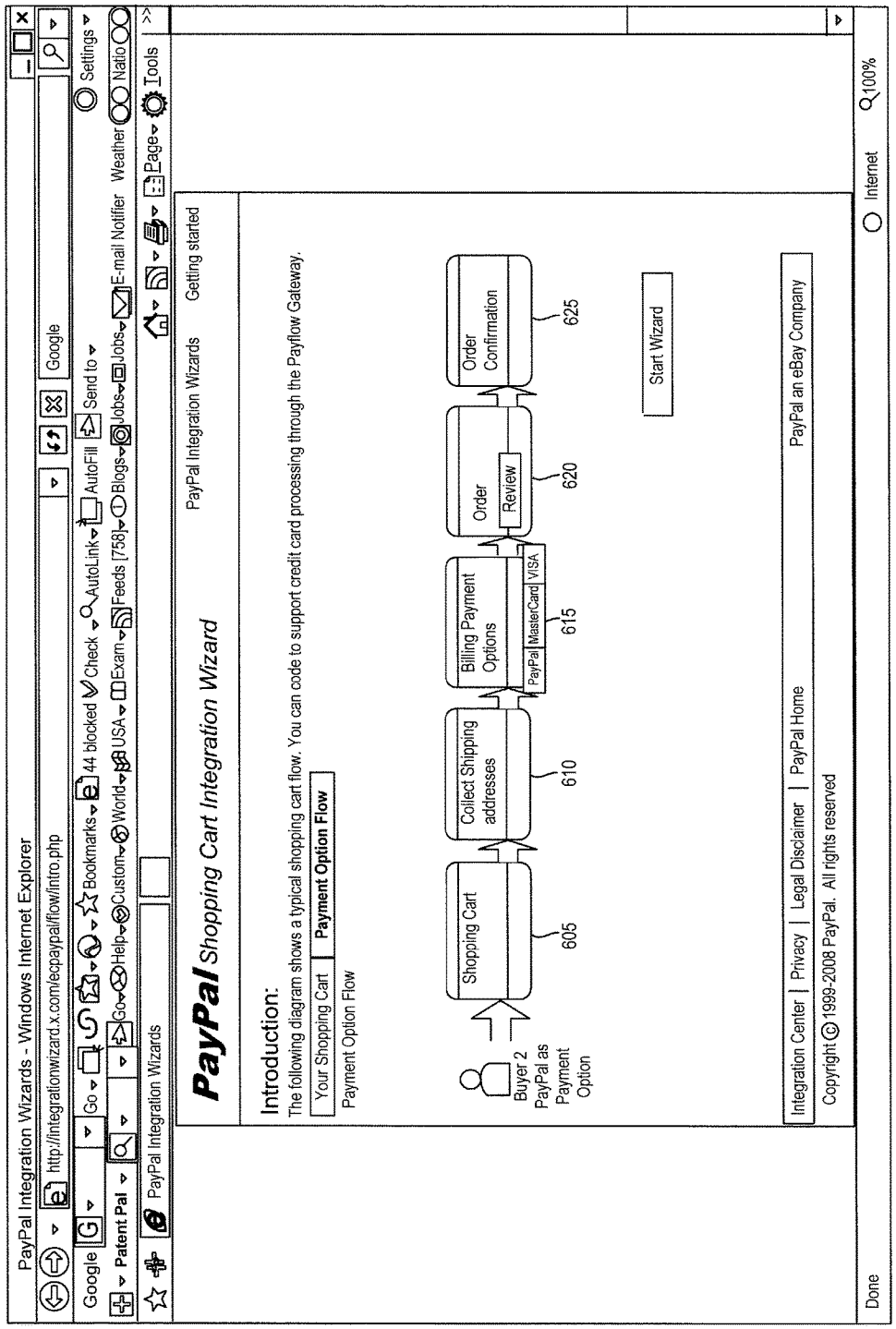
FIG. 6E is a screenshot of another tutorial "page flow" page, educating the merchant on the page flow of the "Payment Option" flow for a credit card, of another selected payment mechanism, according to another embodiment of the invention.

FIG. 6E is a screenshot of another tutorial "page flow" page, educating the merchant on the page flow of the "Payment Option" flow for a credit card, of another selected payment mechanism (here, Credit Card PayFlow), according to another embodiment of the invention. The description of the page flow in FIG. 6E is identical to the description of the page flow in FIG. 6A. The only difference is that there are arrows showing the movement from each page to the next in order to educate the merchant on how a customer can make a purchase and pay for the purchase all while still on the merchant's commercial website the entire time, without leaving to another website.

FIG. 7A is a screenshot of a page requesting API credentials, Shopping Cart Programming Language, a Return URL, a Cancel URL, the Payment Type and the Currency Code of a selected payment mechanism (here, Express Checkout PayPal), according to another embodiment of the invention. API Credentials Fields 705 enable a merchant to enter his or her API Username, API Password, or Signature. If the merchant wants to get help, the merchant can click "PayPal API credentials" in the text "How to get PayPal API credentials" to open up API Credentials Help Box 520, shown in FIG. 5B.

Shopping Cart Programming Language Dropdown Menu 710 allows a merchant to select a programming language from a plurality of programming languages. Currently, Dropdown Menu 710 allows the user to select from either: Active Server Pages (ASP), ASP.Net-C# (ASPX), Java Server Pages (JSP), Java or Java SDK, or PHP. However, this list is merely exemplary and not exhaustive.

Return URL Field 715 enables a merchant to enter a "Return URL". A "Return URL" is usually the "Order Review Page" of the merchant's commercial website, and is the website that a customer "returns" to after visiting an external financial transaction website such as PayPal. For instance, if the merchant's commercial website is coded in HTML, the Return URL is: www.yourstore.com/OrderConfirmPage.htm. Cancel URL Field 720 enables a merchant to enter a "Cancel URL". A "Cancel URL" is usually the "Main Page" of the merchant's commercial website, and is the website that a customer is brought to after cancelling an order. For instance, a potential Cancel URL may be: www.yourstore.com/MainPage.htm.

Payment Type Dropdown Menu 725 allows a merchant to select a "Payment Type". If the merchant is using PayPal, the Payment Type is an input to the Payflow Gateway that allows a merchant to determine when to actually charge the customer or purchaser's PayPal or credit card account. PayPal currently supports two different Payment Types that can be currently selected from Dropdown Menu 725.

The first Payment Type is "Sale" which means that the funds are credited to the merchant's account immediately at the end of the checkout flow, or right after the customer or purchaser finishes the checkout process of web pages. The second Payment Type is "Authorization" which means that the merchant obtains an authorization (or a hold) for the transaction amount and the merchant then captures the funds against this authorization at a later date. Authorizations are valid for up to three days. The fund capture can be done either from the PayPal account or by using a function in the API called "DoCapture". The Payment Types are not limited to only these two and additional Payment Types may be added to Dropdown Menu 725.

Currency Code Dropdown Menu 730 enables a merchant to select a "Currency Code". The "Currency Code" that can be currently selected from Dropdown Menu 730 can comprise, but is not limited to the following: U.S. Dollar [USD], Australian Dollar [AUD], Canadian Dollar [CAD], Swiss Franc [CHF], Czech Koruna [CZK], Danish Krone [DKK], Euro [EUR], Pound Sterling [GBP], Hong Kong Dollar [HKD], Hungarian Forint [HUF], Japanese Yen [JPY], Norwegian Krone [NOK], New Zealand Dollar [NZD], Polish Zloty [PLN], Swedish Krona [SEK], and the Singapore Dollar [SGD]. This is the currency that the customer or purchaser will use to pay the merchant for the product, or the currency that the merchant has decided to accept on his or her commercial website. This list is not exhaustive and additional currencies can be used.

Figure 7B:
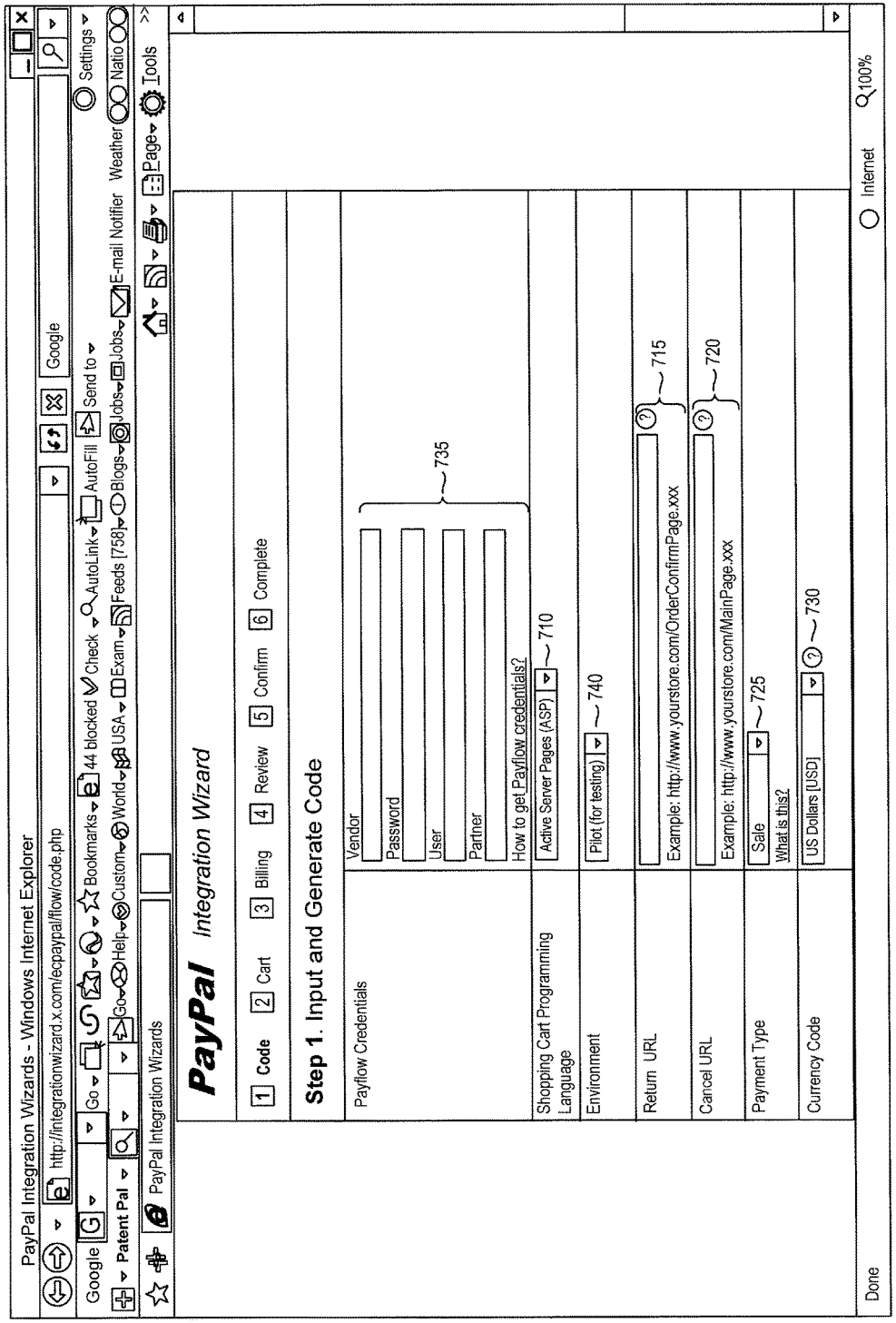
FIG. 7B is a screenshot of a page requesting Payflow credentials, Shopping Cart Programming Language, the Environment, a Return URL, a Cancel URL, the Payment Type, and the Currency Code of another selected payment mechanism, according to another embodiment of the invention.

FIG. 7B is a screenshot of a page requesting Payflow credentials, Shopping Cart Programming Language, the Environment, a Return URL, a Cancel URL, the Payment Type, and the Currency Code of another selected payment mechanism (here, either Express Checkout PayFlow Edition or Credit Card PayFlow), according to another embodiment of the invention. The Shopping Cart Programming Language Dropdown Menu 710, Return URL Field 715, Cancel URL Field 720, Payment Type Dropdown Menu 725, and Currency Code Dropdown Menu 730 are identical to the descriptions of those elements above in FIG. 7A. The only new elements are Payflow Credentials Fields 735 and Environment Dropdown Menu 740. Payflow Credentials Fields 735 enable a merchant to enter his or her Vendor (ID), Password, User (ID) and Partner (ID). The descriptions of these IDs are provided in the description of step 215 in FIG. 2, above. If the merchant wants to get help, the merchant can click "Payflow credentials" in the text "How to get Payflow credentials" to open up Payflow Credentials Help Box 520, shown in FIG. 5D (if using Express Checkout PayFlow Edition) or in FIG. 5F (if using Credit Card PayFlow). Environment Dropdown Menu 740 allows a merchant to select the "Environment" of the integrated code, which usually comprises either "Pilot", for testing purposes, or "Live" which means that the integrated code will automatically be integrated into the actual, live version of the merchant's commercial website on the internet.

Figure 8A:
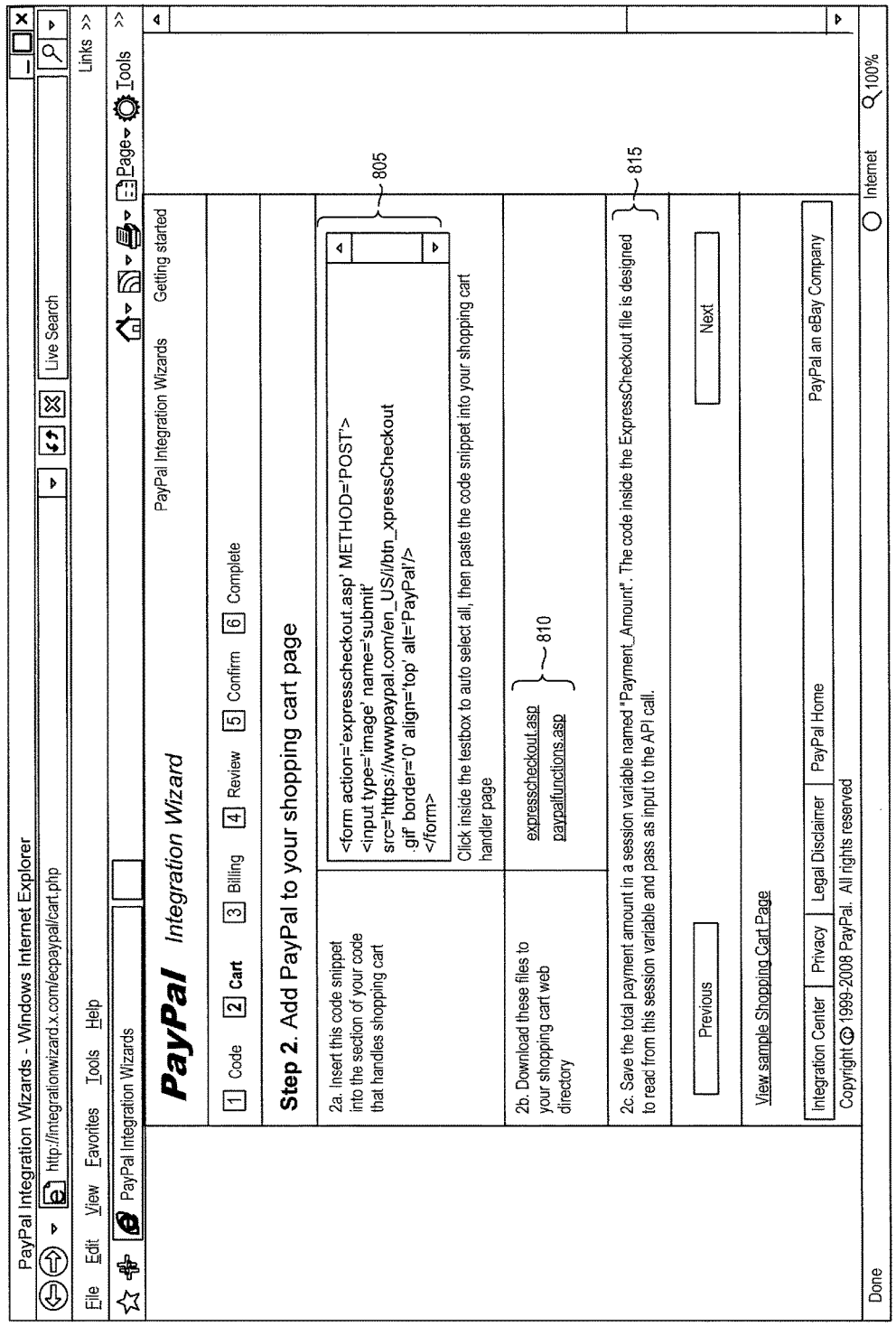
FIG. 8A is a screenshot of a page showing a code snippet and file(s) to use in the "Shopping Cart" page of a merchant's commercial website for a selected payment mechanism, according to another embodiment of the invention.

FIG. 8A is a screenshot of a page showing a code snippet and file(s) to use in the "Shopping Cart Page" of a merchant's commercial website for a selected payment mechanism (here, either Express Checkout PayPal or Express Checkout PayFlow Edition), according to another embodiment of the invention. Code snippet 805 is the code generated from the parameters specified from the various fields and dropdown menus in FIG. 7A. For instance, the text specified in the Return URL Field 715 and the Cancel URL Field 720 from FIG. 7A or 7B have been substituted for the text in code snippet 805, as have the values selected from the Payment Type Dropdown Menu 725 and the Currency Code Dropdown Menu 730. Code snippet 805 is placed into the "Shopping Cart Page" of the merchant's commercial website, or the section of the merchant's commercial website code that handles the shopping cart. Shopping Cart Web Directory Files 810 are generated from what Programming Language was selected from the Shopping Cart Programming Language Dropdown Menu 710 in FIG. 7A or 7B. For instance, if ASP was selected, then two files: expresscheckout.asp, paypalfunctions.asp are generated. If JSP, Java (or Java SDK), or PHP are selected, then two files will also be generated: e.g. expresscheckout.jsp, paypalfunctions.jsp (for JSP), expresscheckout.java, paypalfunctions.java (for Java), or expresscheckout.php, paypalfunctions.php (for PHP). If ASPX is selected, however, there will be five files generated: expresscheckout.aspx, expresscheckout.aspx.cs, APIError.aspx, APIError.aspx.cs, and paypalfunctions.cs, the final file which is placed into the "AppCode" subdirectory of the merchant's Net web application. Shopping Cart Web Directory Files 810 is placed in the shopping cart web directory of the merchant's commercial website.

Finally, Payment_Amount Variable Instruction 815 instructs the merchant to save the total payment amount (a numerical value) in a session variable named "Payment_Amount". The code inside the ExpressCheckout file (e.g. expresscheckout.asp) is designed to read from this session variable and pass it as input to an API function call.

Figure 8B:
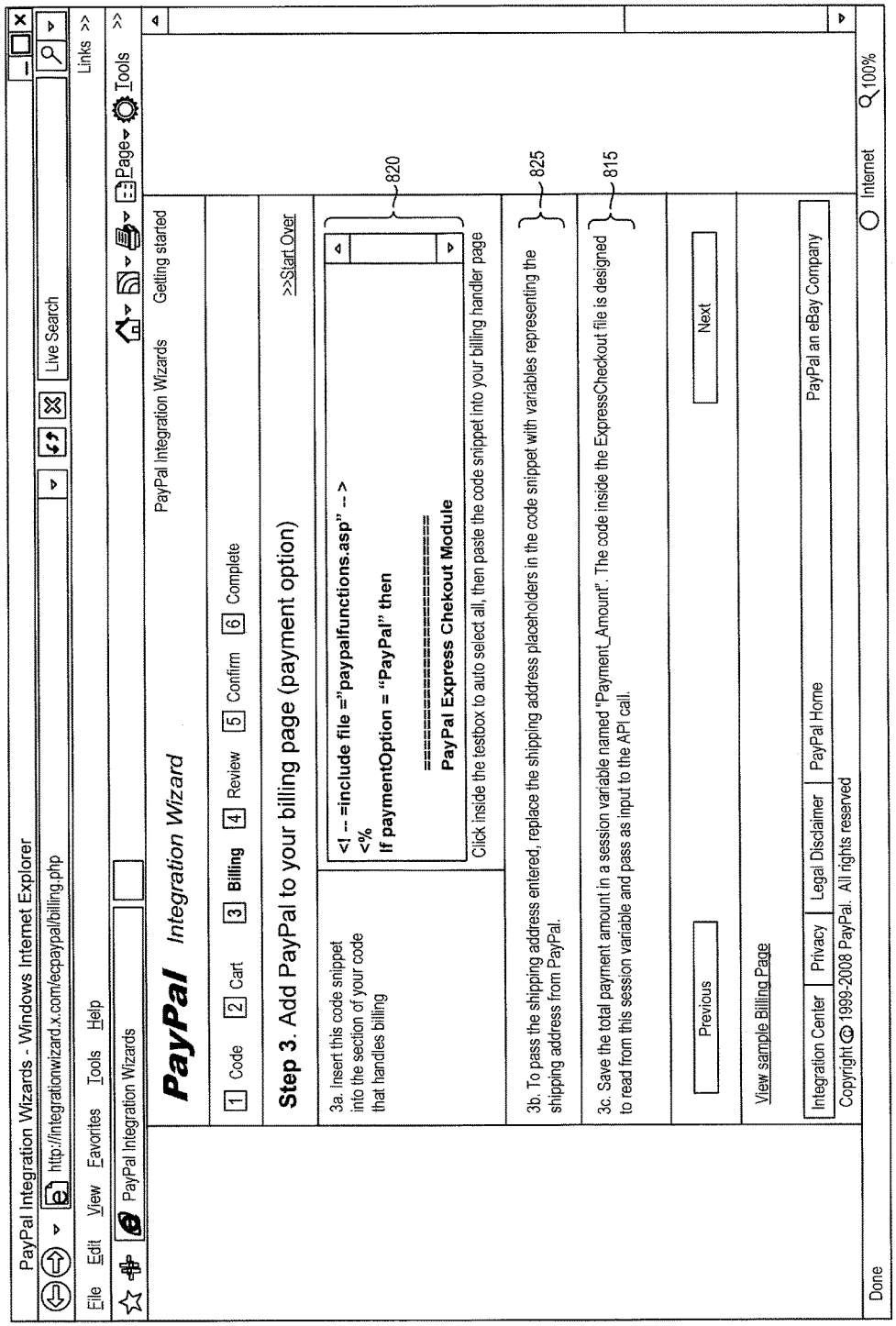
FIG. 8B is a screenshot of a page showing a code snippet to insert into to the "Billing Page" page of a merchant's commercial website for a selected payment mechanism, according to another embodiment of the invention.

FIG. 8B is a screenshot of a page showing a code snippet to insert into to the "Billing Page" of a merchant's commercial website for a selected payment mechanism (here, either Express Checkout PayPal or Express Checkout PayFlow Edition), according to another embodiment of the invention. Code snippet 820, generated from the parameters specified in the fields and dropdown menus of FIG. 7A or 7B, are placed on the "Billing Page" of the merchant's commercial website, or the section of the merchant's commercial website code that handles billing. Shipping Address Instruction 825 instructs the merchant in order to pass the shipping address entered by the customer, the shipping address placeholders in code snippet 820 are replaced with variables representing the shipping address. These variables are provided by PayPal, or can be created by the merchant. Payment_Amount Variable Instruction 815 is the same as in FIG. 8A.

Figure 8C:
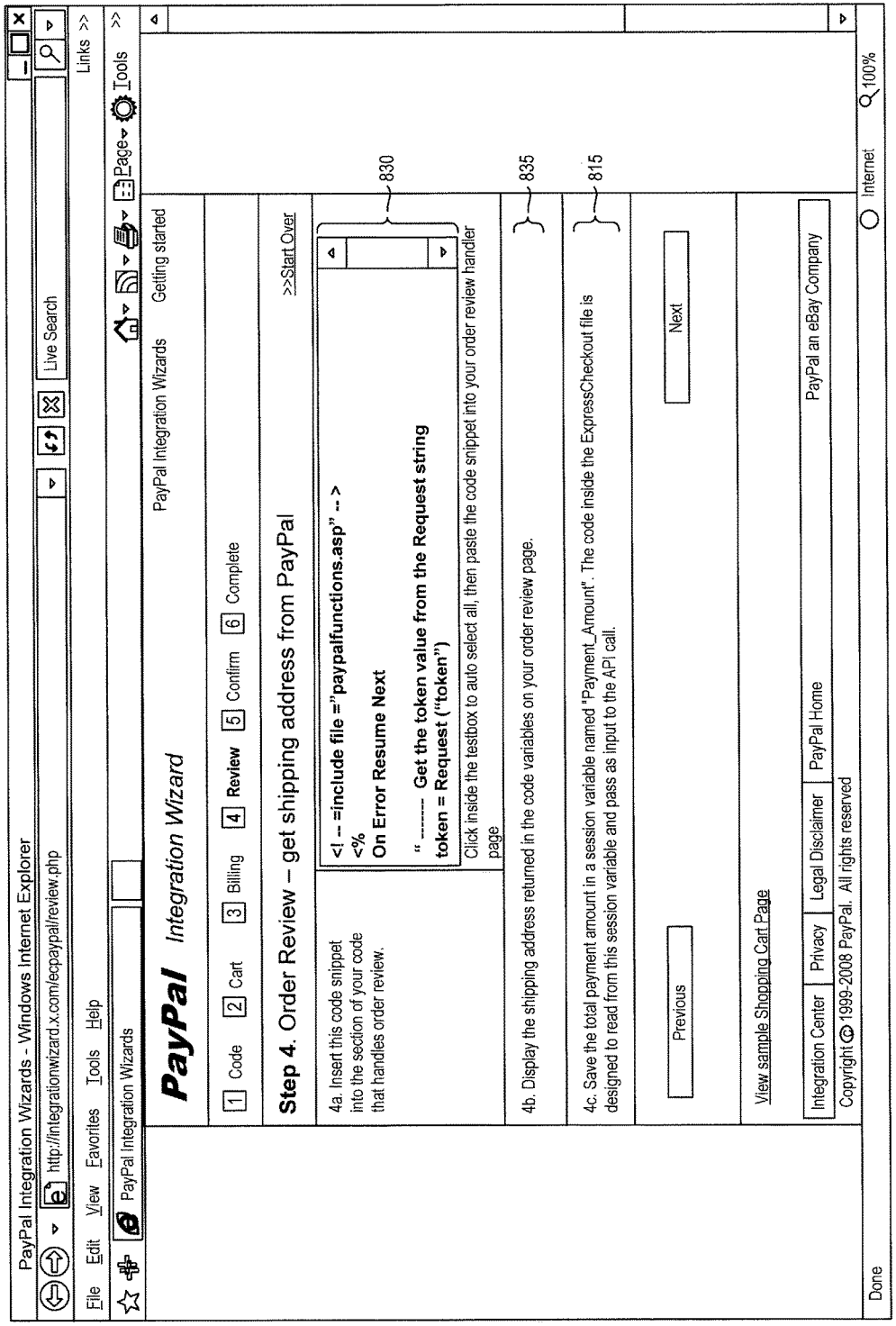
FIG. 8C is a screenshot of a page showing a code snippet to insert into to the "Order Review" page of a merchant's commercial website for a selected payment mechanism, according to another embodiment of the invention.

FIG. 8C is a screenshot of a page showing a code snippet to insert into to the "Order Review Page" of a merchant's commercial website for a selected payment mechanism (here, either Express Checkout PayPal or Express Checkout PayFlow Edition), according to another embodiment of the invention. Code snippet 830, generated from the parameters specified in the fields and dropdown menus of FIG. 7A or 7B, are placed on the "Order Review Page" of the merchant's commercial website, or the section of the merchant's commercial website code that handles order review. Shipping Address Display Instruction 835 instructs the merchant to display the shipping address returned in the code variables on the "Order Review Page" so that the customer can review the shipping address after the information has been submitted. Finally, Payment_Amount Variable Instruction 815 is the same as FIG. 8A.

Figure 8D:
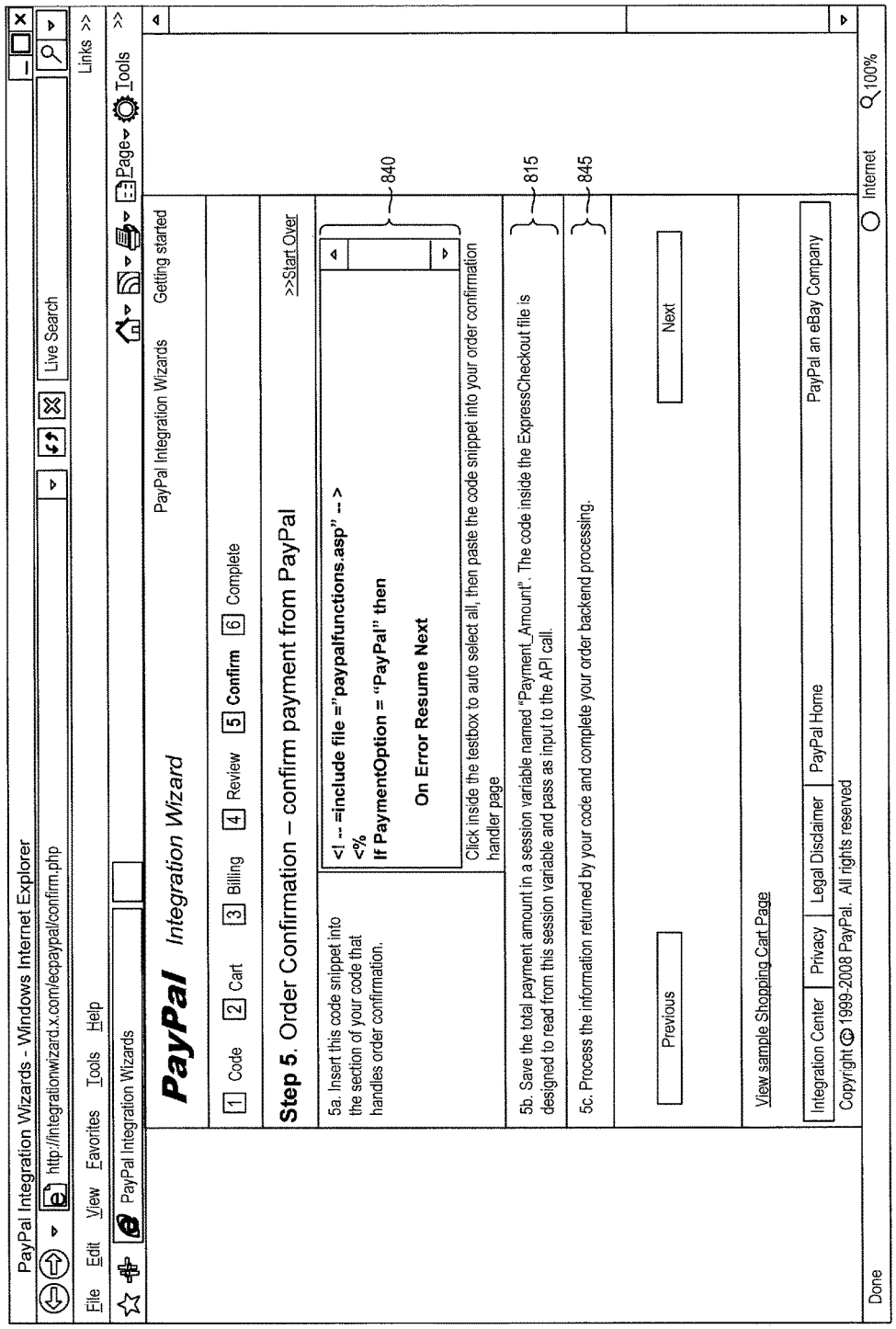
FIG. 8D is a screenshot of a page showing a code snippet to insert into the "Order Confirmation" page of a merchant's commercial website for a selected payment mechanism, according to another embodiment of the invention.

FIG. 8D is a screenshot of a page showing a code snippet to insert into the "Order Confirmation Page" of a merchant's commercial website for a selected payment mechanism (here, either Express Checkout PayPal or Express Checkout PayFlow Edition), according to another embodiment of the invention. Code snippet 840, generated from the parameters specified in the fields and dropdown menus of FIG. 7A or 7B, are placed on the "Order Confirmation Page" of the merchant's commercial website, or the section of the merchant's commercial website code that handles order confirmation. Payment_Amount Variable Instruction 815 is the same as FIG. 8A. Processing Instruction 845 instructs the merchant to process the information returned by the code and complete the merchant's order backend processing.

Figure 8E:
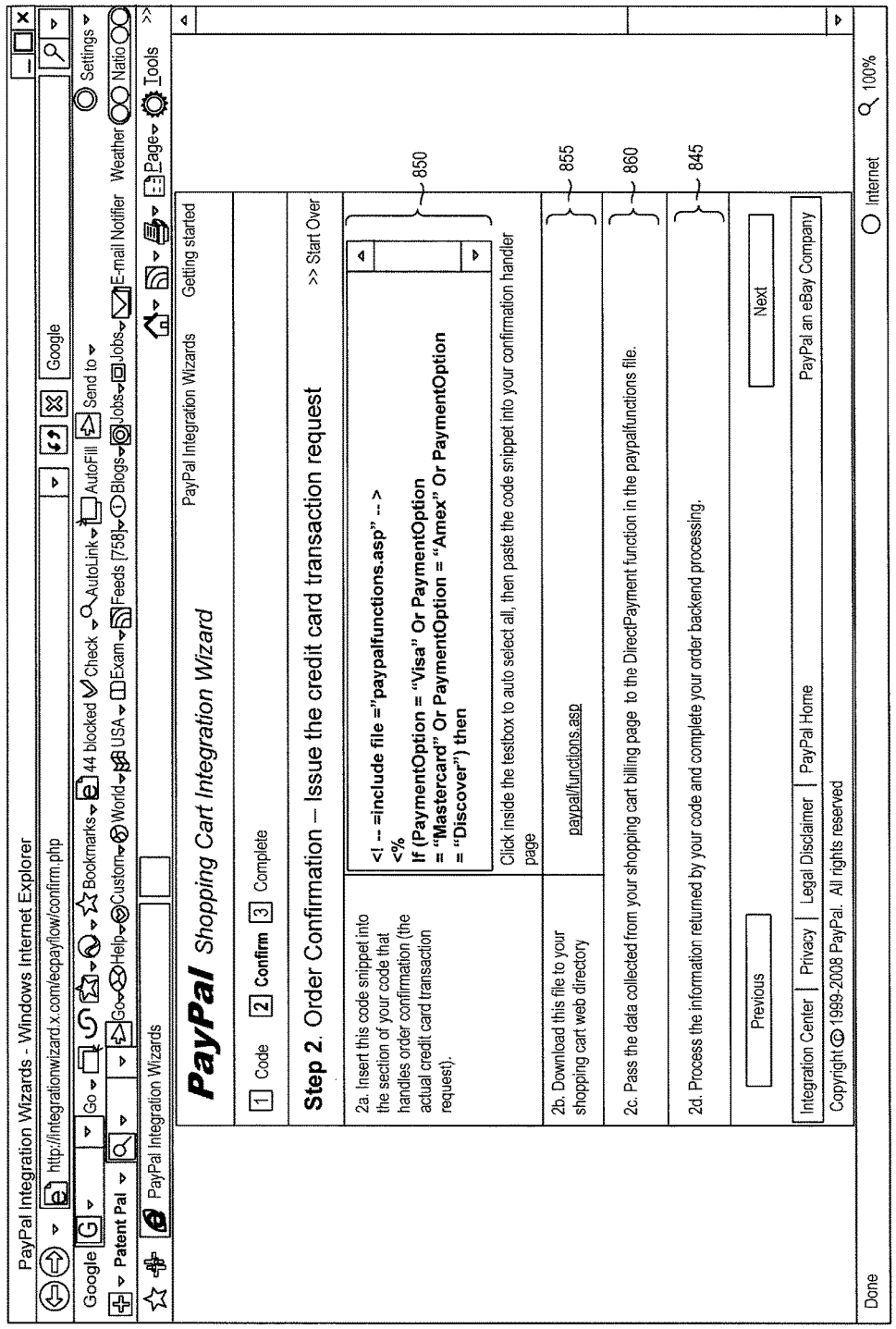
FIG. 8E is a screenshot of a page showing a code snippet and file(s) to insert into the "Credit Card" transaction page of a merchant's commercial website for another selected payment mechanism, according to another embodiment of the invention.

FIG. 8E is a screenshot of a page showing a code snippet and file(s) to insert into the "Credit Card" transaction page of a merchant's commercial website for another selected payment mechanism (here, Credit Card PayFlow), according to another embodiment of the invention. Code snippet 850, generated from the parameters specified in the fields and dropdown menu of FIG. 7B, are placed on the "Order Confirmation Page" of the merchant's commercial website, or the section of the merchant's commercial website code that handles order confirmation. Shopping Cart Web Directory Files 855 are identical to the Shopping Cart Web Directory Files 810 described above in FIG. 8A, except that there will be no "expresscheckout.xxx" file, where "xxx" is the extension "asp", "aspx", "cs", "jsp", "java", "php", or another file extension. Passing Data Instruction 860 instructs the merchant to pass the data collected from the "Billing Page" after the "Shopping Cart Page" to the "DirectPayment" function in the paypalfunctions file. Finally, Processing Instruction 845 is the same as in FIG. 8D.

Figure 8F:
FIG. 8F, FIG. 8G, and FIG. 8H are screenshots showing example sections of a merchant's commercial website.
Figure 8G:
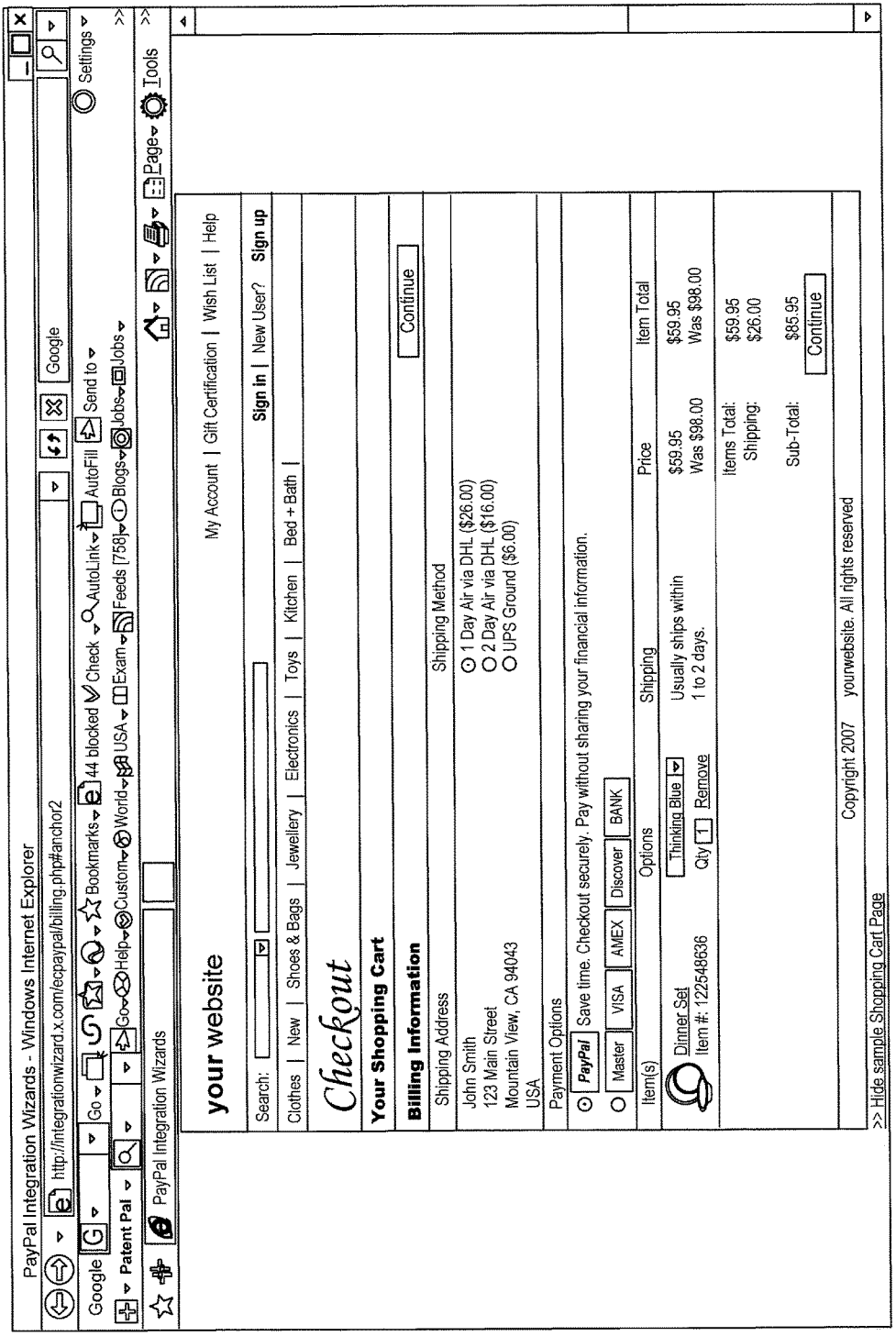
Figure 8H:
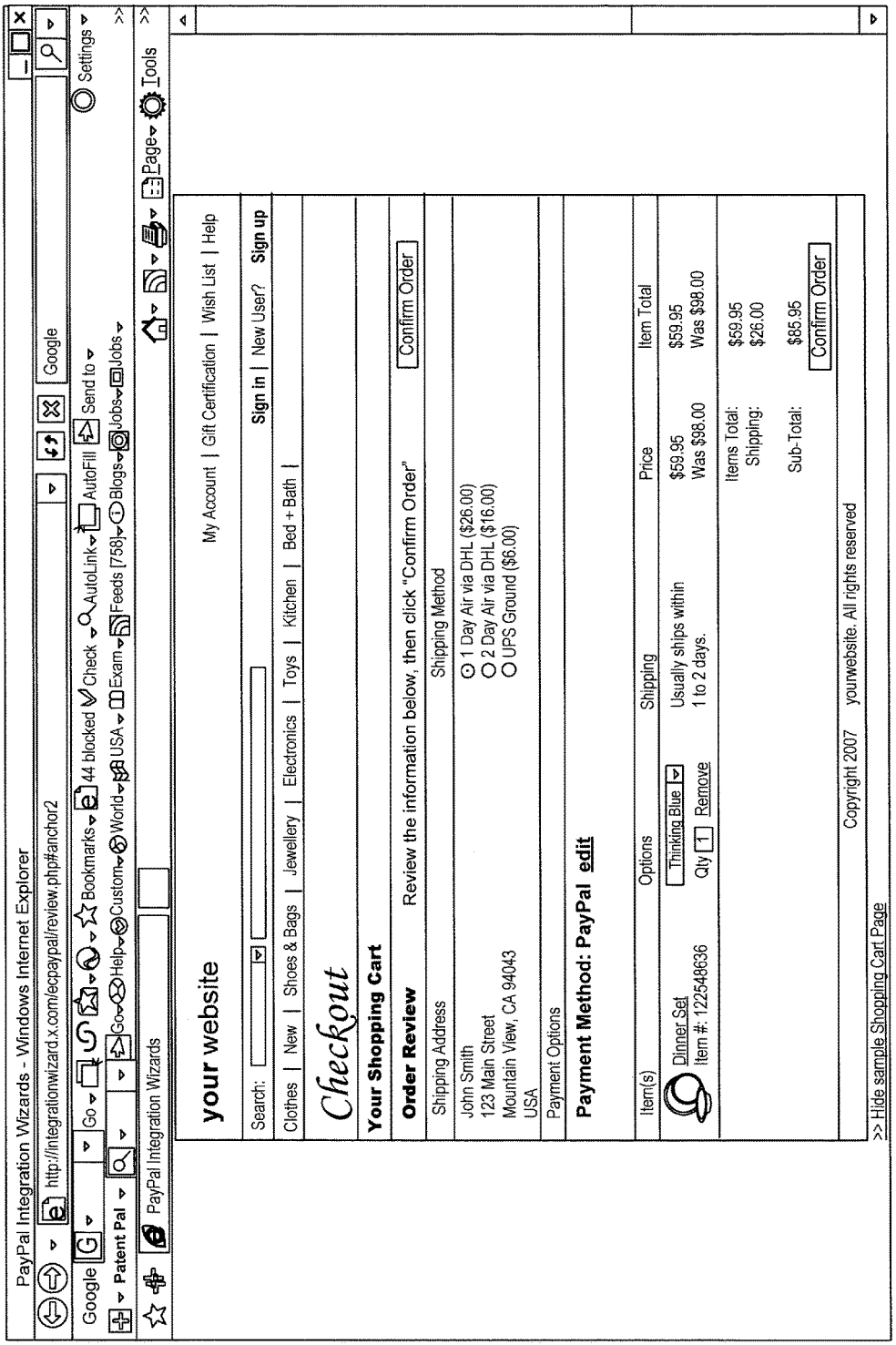

FIG. 8F, FIG. 8G and FIG. 8H are screenshots showing example sections of a merchant's commercial website. FIG. 8F is a screenshot showing a sample "Shopping Cart Page". If the merchant clicks "View sample Shopping Cart Page" in FIG. 8A, then FIG. 8F will be viewed. FIG. 8G is a screenshot showing a sample "Billing Page". If the merchant clicks "View sample Billing Page" in FIG. 8B, then FIG. 8G will be viewed. FIG. 8H is a screenshot showing a sample "Order Review Page". If the merchant clicks "View sample Order Review Page" in FIG. 8C, then FIG. 8H will be viewed.

Figure 9A:
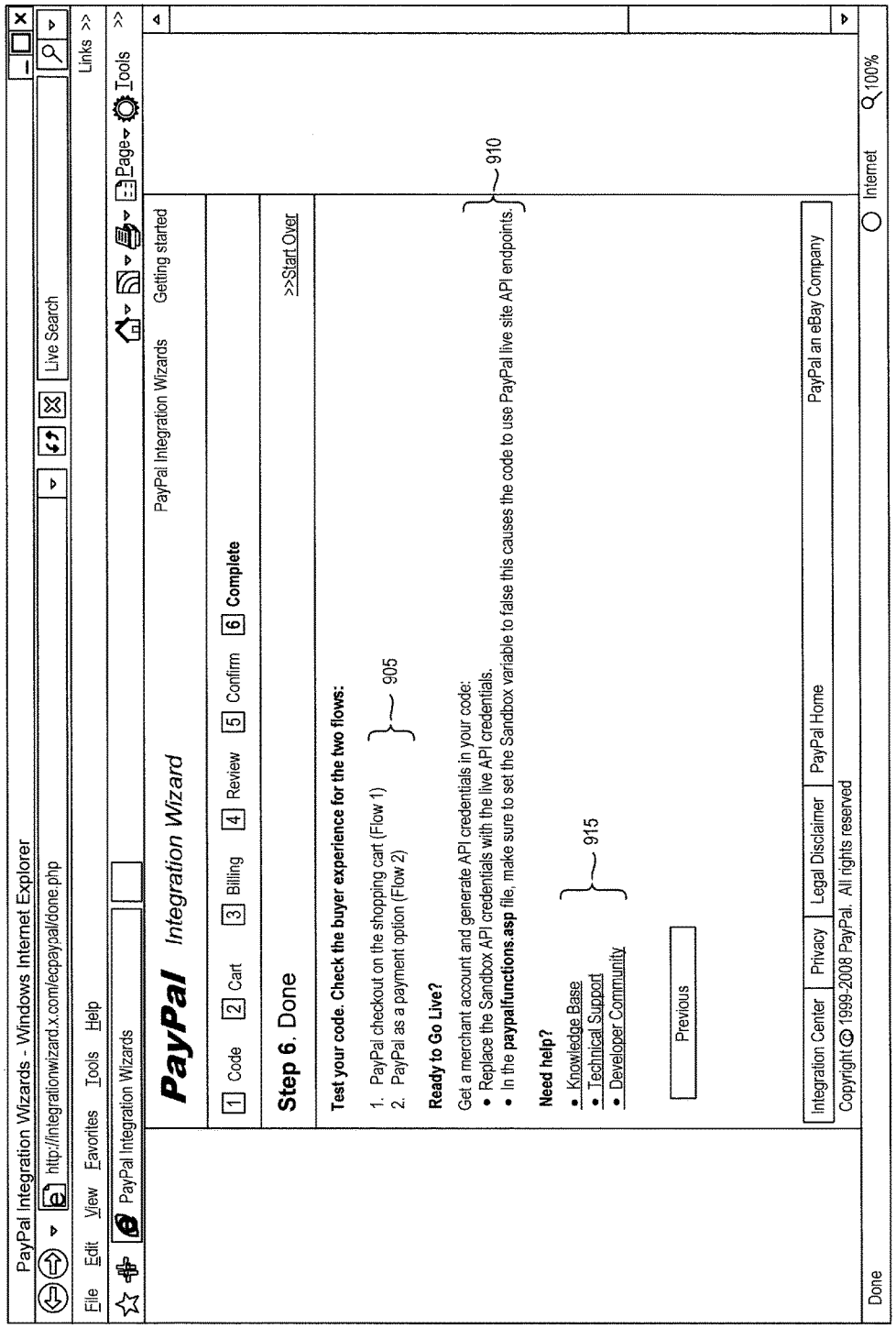
FIG. 9A is a screenshot of a page showing the completion of integration of code on a merchant's commercial website for a selected payment mechanism, according to another embodiment of the invention.

FIG. 9A is a screenshot of a page showing the completion of integration of code on a merchant's commercial website for a selected payment mechanism (here, Express Checkout PayPal), according to another embodiment of the invention. Flow tutorials 905 instruct the merchant on the page flows for the entire checkout process. If the merchant clicks "Flow 1", a page flow identical to FIG. 6B will be viewed. If the merchant clicks "Flow 2", a page flow identical to FIG. 6C will be viewed. API Credential Go Live Instructions 910 instruct the merchant on how to go live with the integrated code once the merchant has a merchant account with API Credentials. In the integrated code, the merchant replaces the Sandbox API Credentials with the live API Credentials, and then in the paypalfunctions.xxx file (xxx being asp, aspx, cs, jsp, java, php, etc.), the merchant sets the Sandbox variable to false in order to cause the code to use the PayPal live site API endpoints. Finally, Help Resources 915 provides the merchant with resources if the merchant has any questions. If the merchant clicks "Knowledge Base", the website at: ppmts.custhelp.com/cgi-bin/ppdts.cfg/php/enduser/std_alp.php (PayPal Merchant Technical Services, Answer/Knowledge Base) will open up. If the merchant clicks "Technical Support", the merchant will also be brought to the same above website. If the merchant clicks "Developer Community", the website at: www.pdncommunity.com/pdn/blog?blog.id=devblog (PayPal Developer Community—PayPal Developer Blog) will open up.

Figure 9B:
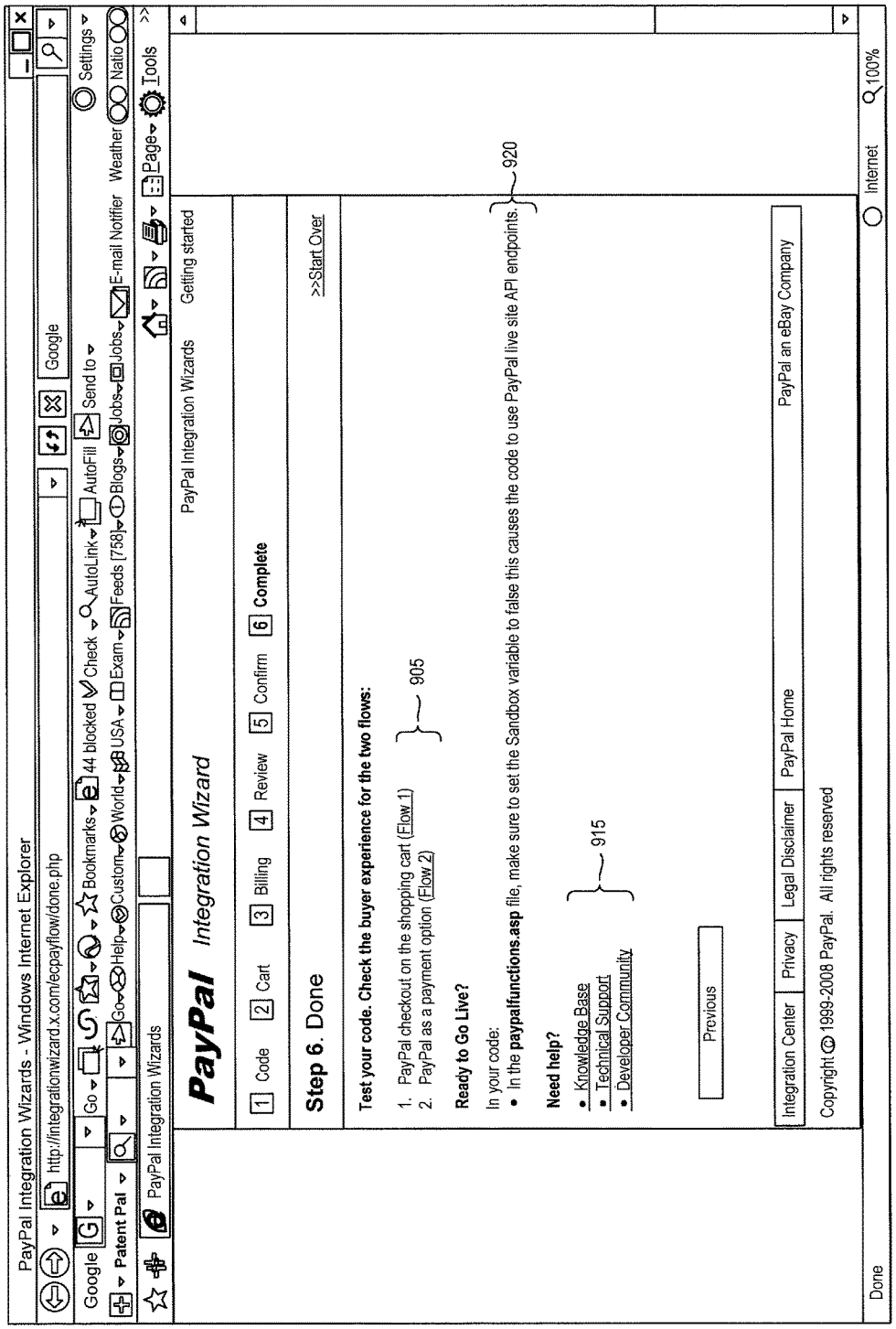
FIG. 9B is a screenshot of a page showing the completion of integration of code on a merchant's commercial website for another selected payment mechanism, according to another embodiment of the invention.

FIG. 9B is a screenshot of a page showing the completion of integration of code on a merchant's commercial website for another selected payment mechanism (here, Express Checkout PayFlow Edition), according to another embodiment of the invention. Flow tutorials 905 and Help Resources 915 are the same as in FIG. 9A.

Payflow Credential Go Live Instructions 920 instruct the merchant how to "go live" with the finally integrated code. In the paypalfunctions.xxx file (xxx being asp, aspx, cs, jsp, java, php, etc.), the merchant makes sure to set the Sandbox variable to false to cause the code to use the Payflow live site API endpoints. This is identical to the API Credential Go Live Instructions 910 in FIG. 9A, except that there is no need to "Replace the Sandbox API credentials with the live API credentials".

Figure 9C:
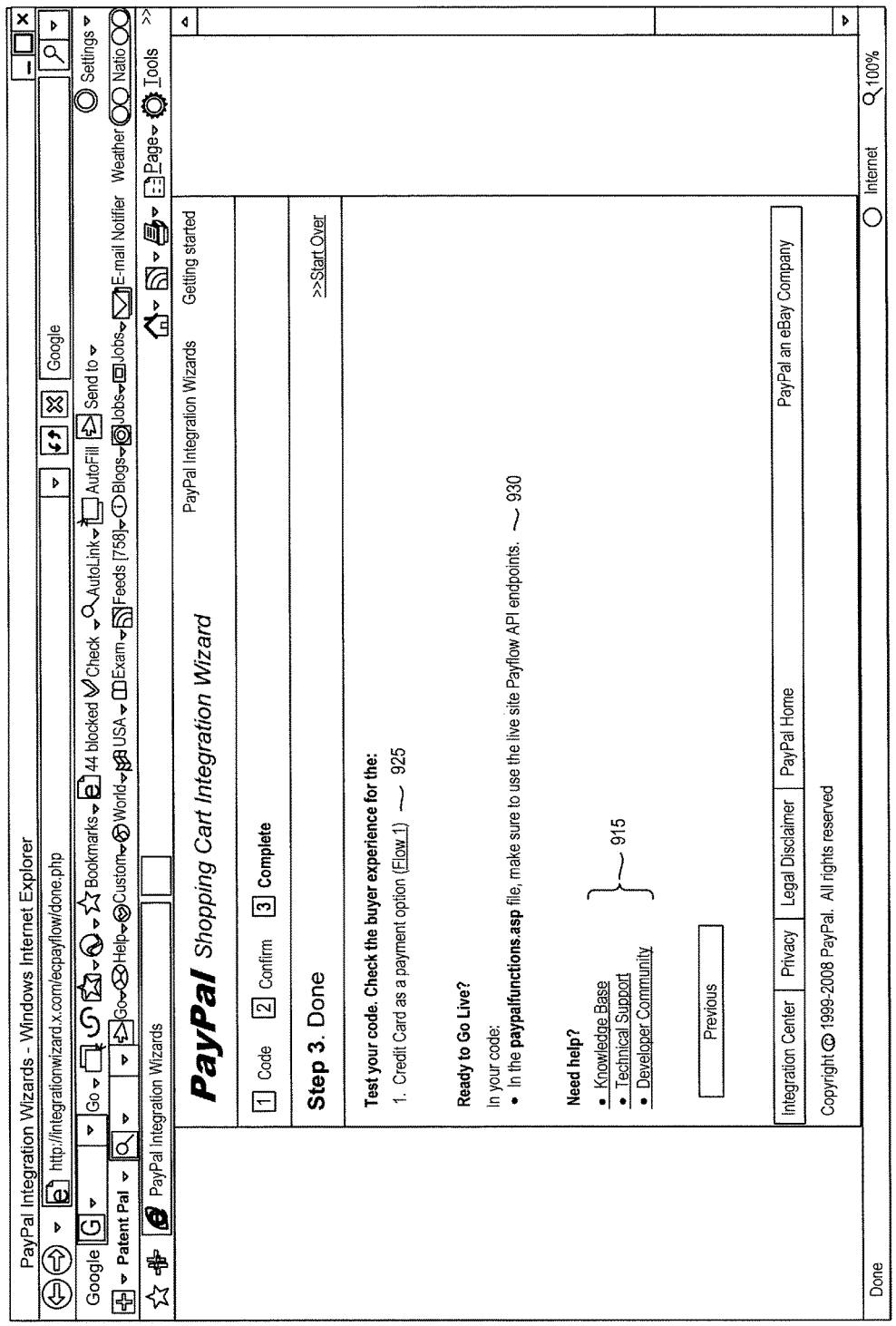
FIG. 9C is a screenshot of a page showing the completion of integration of code on a merchant's commercial website for yet another selected payment mechanism, according to another embodiment of the invention.

FIG. 9C is a screenshot of a page showing the completion of integration of code on a merchant's commercial website for yet another selected payment mechanism (here, Credit Card PayFlow), according to another embodiment of the invention. Flow tutorial 925 instructs the merchant on the page flow of the checkout process where a customer stays on the merchant's commercial website the entire time. If the merchant clicks "Flow 1" then a page flow identical to FIG. 6E will appear. Short Payflow Credentials Go Live Instructions 930 are identical to the Payflow Credentials Go Live Instructions 920 in FIG. 9B, except there is no need to set the Sandbox variable to false. The instruction merely tells the merchant to make sure to use the live site Payflow API endpoints in the paypalfunctions.xxx file, (xxx being asp, aspx, cs, jsp, java, php, etc.). Help Resources 915 are the same as in FIG. 9A.

The above-described embodiments of the present invention are merely meant to be illustrative and not limiting. For example, on-line financial transaction services and products other than PayPal are also suitable for the present invention. Various methods have been described; however, not all steps may be required for certain applications and steps may also be modified to meet specific needs. It will thus be obvious to those skilled in the art that various changes and modifications may be made without departing from this invention in its broader aspects. Therefore, the appended claims encompass all such changes and modifications as they fall within the true spirit and scope of this invention.

We claim:

1. A system, comprising:
   a non-transitory memory; and
   one or more hardware processors coupled to the non-transitory memory and configured to read instructions from the non-transitory memory to cause the system to perform operations comprising:
      receiving a request to integrate an application programming interface (API)-based mechanism with an online website based at least on a first input received from a user interface of a device;
      accepting a plurality of credentials and parameters based at least on a second input received from the user interface;
      generating a plurality of code snippets and files based at least on the plurality of credentials and parameters, wherein the plurality of code snippets and files are configured to be tested in a sandbox environment or integrated live with the online website;
      transferring the plurality of code snippets and files to the device for display of an indication of the transferred plurality of code snippets and files on the user interface;
      communicating integration instructions to the device configured to integrate the plurality of code snippets and files with the online website to offer the API-based mechanism to visitors of the online website; and
      communicating test instructions to the device configured to test the the plurality of code snippets and files in the sandbox environment.

2. The system of claim 1, wherein the operations further comprise:
      transferring page flow information to the device that causes the user interface to display a graphical representation comprising instructions to a given visitor to proceed from a shopping cart to a check out with the API-based mechanism.

3. The system of claim 1, wherein the integration instructions are presented to the user interface with page flows of the API-based mechanism.

4. The system of claim 1, wherein the operations further comprise receiving the second input from the user interface, wherein receiving the second input further comprises:
receiving a selected plurality of credentials from the plurality of credentials and parameters, wherein the selected plurality of credentials is received based at least on a plurality of credential fields provided by the user interface;
receiving a selection of a shopping cart programming language, wherein the selection is received from the user interface;
receiving an input of a return URL, wherein the input of the return URL is received from the user interface;
receiving an input of a cancel URL, wherein the input of the cancel URL is received from the user interface; and
receiving a selection of a payment type, wherein the selection of the payment type is received from the user interface.

5. The system of claim 1, wherein the operations further comprise:
determining the API-based mechanism requires a visitor to leave the online website to make a payment;
communicating a first set of the integration instructions to the user interface to integrate the API-based mechanism into a shopping cart page of the online website based at least on the API-based mechanism requiring the visitor to leave the online website to make the payment
communicating a second set of the integration instructions to the user interface to integrate the API-based mechanism into a billing page of the online website based at least on the API-based mechanism requiring the visitor to leave the online website to make the payment;
communicating a third set of the integration instructions to the user interface to integrate the API-based mechanism into an order review page of the online website based at least on the API-based mechanism requiring the visitor to leave the online website to make the payment; and
communicating a fourth set of the integration instructions to the user interface to integrate the API-based mechanism into an order confirmation page of the online website based at least on the API-based mechanism requiring the visitor to leave the online website to make the payment.

6. The system of claim 5, wherein the operations further comprise:
retrieving a code snippet associated with the shopping cart page from the plurality of code snippets and files;
inserting the code snippet into a code section of the online website where the shopping cart page is located;
placing files from the plurality of code snippets and files into a shopping cart web directory of the online website; and
saving a total payment amount associated with the shopping cart page in a session variable.

7. The system of claim 5, wherein the operations further comprise:
retrieving a code snippet associated with the billing page from the plurality of code snippets and files;
inserting the code snippet into a code section of the online website where the billing page is located;
replacing a shipping address placeholder in the billing page with variables representing a shipping address; and
saving a total payment amount associated with the billing page in a session variable.

8. The system of claim 5, wherein the operations further comprise:
retrieving a code snippet associated with the order review page from the plurality of code snippets and files;
inserting the code snippet into a code section of the online website where the order review page is located;
causing the order review page to display a shipping address; and
saving a total payment amount associated with the order review page in a session variable.

9. The system of claim 5, wherein the operations further comprise:
retrieving a code snippet associated with the order confirmation page from the plurality of code snippets and files;
inserting the code snippet into a code section of the online website where the order confirmation page is located;
saving a total payment amount associated with the order confirmation page in a session variable;
processing information returned by the code snippet; and
completing order backend processing for the online website associated with the order confirmation page.

10. A non-transitory machine-readable medium having stored thereon machine-readable instructions executable to cause a machine to perform operations comprising:
receiving a request to integrate an application programming interface (API)-based mechanism with an online website based at least on a first input received from a user interface of a device;
accepting a plurality of credentials and parameters based at least on a second input received from the user interface;
generating a plurality of code snippets and files based at least on the plurality of credentials and parameters, wherein the plurality of code snippets and files are configured to be tested in a sandbox environment or integrated live with the online website;
transferring the plurality of code snippets and files to the device for display of an indication of the transferred plurality of code snippets and files on the user interface; and
communicating integration instructions to the device configured to integrate the plurality of code snippets and files with the online website to offer the API-based mechanism to visitors of the online website; and
communicating test instructions to the device configured to test the plurality of code snippets and files in the sandbox environment.

11. The non-transitory machine-readable medium of claim 10, wherein the operations further comprise:
transferring page flow information to the device that causes the user interface to display a graphical representation comprising instructions to a visitor to proceed from a shopping cart to a check out with the API-based mechanism.

12. The non-transitory machine-readable medium of claim 10, wherein the integration instructions are presented to the user interface with page flows of the API-based mechanism.

13. The non-transitory machine-readable medium of claim 10, wherein the operations further comprise receiving the second input from the user interface, wherein receiving the second input further comprises:

receiving a selected plurality of credentials from the plurality of credentials and parameters, wherein the selected plurality of credentials is received based at least on a plurality of credential fields provided by the user interface;

receiving a selection of a shopping cart programming language, wherein the selection is received from the user interface;

receiving an input of a return URL, wherein the input of the return URL is received from the user interface;

receiving an input of a cancel URL, wherein the input of the cancel URL is received from the user interface; and receiving a selection of a payment type, wherein the selection of the payment type is received from the user interface.

14. The non-transitory machine-readable medium of claim 10, wherein the the operations further comprise:

determining the API-based mechanism requires a visitor to leave the online website to make a payment;

communicating a first set of the integration instructions to the user interface to integrate the API-based mechanism into a shopping cart page of the online website based at least on the API-based mechanism requiring the visitor to leave the online website to make the payment;

communicating a second set of the integration instructions to the user interface to integrate the API-based mechanism into a billing page of the online website based at least on the API-based mechanism requiring the visitor to leave the online website to make the payment;

communicating a third set of the integration instructions to the user interface to integrate the API-based mechanism into an order review page of the online website based at least on the API-based mechanism requiring the visitor to leave the online website to make the payment; and communicating a fourth set of the integration instructions to the user interface to integrate the API-based mechanism into an order confirmation page of the online website based at least on the API-based mechanism requiring the visitor to leave the online website to make the payment.

15. The non-transitory machine-readable medium of claim 14, wherein the operations further comprise:

retrieving a code snippet associated with the shopping cart page from the plurality of code snippets and files;

inserting the code snippet into a code section of the online website where the shopping cart page is located;

placing files from the plurality of code snippets and files into a shopping cart web directory of the online website; and saving a total payment associated with the shopping cart page amount in a session variable.

16. The non-transitory machine-readable medium of claim 14, wherein the operations further comprise:

retrieving a code snippet associated with the billing page from the plurality of code snippets and files;

inserting the code snippet into a code section of the online website where the billing page is located;

replacing a shipping address placeholder in the billing page with variables representing a shipping address; and saving a total payment amount associated with the billing page in a session variable.

17. The non-transitory machine-readable medium of claim 14, wherein the operations further comprise:

retrieving a code snippet associated with the order review page from the plurality of code snippets and files;

inserting the code snippet into a code section of the online website where the order review page is located;

causing the order review page to display a shipping address; and saving a total payment amount associated with the order review page in a session variable.

18. The non-transitory machine-readable medium of claim 14, wherein the operations further comprise:

retrieving a code snippet associated with the order confirmation page from the plurality of code snippets and files;

inserting the code snippet into a code section of the online website where the order confirmation page is located;

saving a total payment amount associated with the order confirmation page in a session variable;

processing information returned by the code snippet; and completing order backend processing for the online website associated with the order confirmation page.

19. A method, comprising:

receiving request to integrate an application programming interface (API)-based mechanism with an online website based at least on a first input received from a user interface of a device;

accepting a plurality of credentials and parameters based at least on a second input received from the user interface;

generating, by a hardware processor of a server, a plurality of code snippets and files based at least on the plurality of credentials and parameters, wherein the plurality of code snippets and files are configured to be tested in a sandbox environment or integrated live with the online website;

transferring the plurality of code snippets and files to the device for display of an indication of the transferred plurality of code snippets and files on the user interface; and communicating integration instructions to the device configured to integrate the plurality of code snippets and files with the online website to offer the API-based mechanism to visitors of the online website; and communicating test instructions to the device configured to test the plurality of code snippets and files in the sandbox environment.

20. The method of claim 19, further comprising transferring page flow information to the device that causes the user interface to display a graphical representation comprising instructions to a visitor to proceed from a shopping cart to a check out with the API-based mechanism.

21. The method of claim 19, wherein the integration instructions are presented to the user interface with page flows of the API-based mechanism.

* * * * *

UNITED STATES PATENT AND TRADEMARK OFFICE
CERTIFICATE OF CORRECTION

| | | |
|---|---|---|
| PATENT NO. | : 10,339,505 B2 | Page 1 of 1 |
| APPLICATION NO. | : 13/586763 | |
| DATED | : July 2, 2019 | |
| INVENTOR(S) | : Srinivasa Rao Pasupulati et al. | |

It is certified that error appears in the above-identified patent and that said Letters Patent is hereby corrected as shown below:

In the Claims

In Column 16, Line 62, change "to test the the plurality of code" to --to test the plurality of code--

In Column 17, Line 33, change "to make the payment" to --to make the payment;--

Signed and Sealed this
Twenty-eighth Day of April, 2020

Andrei Iancu
*Director of the United States Patent and Trademark Office*